US009830366B2

(12) United States Patent
Wagner

(10) Patent No.: US 9,830,366 B2
(45) Date of Patent: Nov. 28, 2017

(54) ONLINE ANALYTIC PROCESSING CUBE WITH TIME STAMPING

(75) Inventor: Steven Wagner, Cupertino, CA (US)

(73) Assignee: Thomson Reuters Global Resources, Baar (CH)

(*) Notice: Subject to any disclaimer, the term of this patent is extended or adjusted under 35 U.S.C. 154(b) by 911 days.

(21) Appl. No.: 12/383,453

(22) Filed: Mar. 23, 2009

(65) Prior Publication Data

US 2010/0250412 A1 Sep. 30, 2010

Related U.S. Application Data

(60) Provisional application No. 61/038,745, filed on Mar. 22, 2008.

(51) Int. Cl.
  *G06F 17/30* (2006.01)
  *G06Q 40/02* (2012.01)
  *G06Q 40/00* (2012.01)

(52) U.S. Cl.
  CPC .. *G06F 17/30539* (2013.01); *G06F 17/30551* (2013.01); *G06Q 40/02* (2013.01); *G06Q 40/123* (2013.12); *G06F 2216/03* (2013.01)

(58) Field of Classification Search
  USPC .......................................................... 705/31
  See application file for complete search history.

(56) References Cited

U.S. PATENT DOCUMENTS

| | | |
|---|---|---|
| 5,212,788 A | 5/1993 | Lomet et al. |
| 5,978,788 A | 11/1999 | Castelli et al. |
| 6,430,545 B1 * | 8/2002 | Honarvar ............... G06Q 10/06 705/35 |
| 6,581,068 B1 | 6/2003 | Bensoussan et al. |
| 6,629,102 B1 | 9/2003 | Malloy et al. |
| 6,831,668 B2 | 12/2004 | Cras et al. |
| 7,035,877 B2 | 4/2006 | Markham et al. |
| 7,043,448 B2 | 5/2006 | Campbell |
| 7,111,010 B2 | 9/2006 | Chen |
| 7,203,671 B1 | 4/2007 | Wong |
| 7,233,947 B2 | 6/2007 | Lomet |
| 7,302,639 B1 | 11/2007 | Everhart et al. |
| 7,321,907 B2 | 1/2008 | Tsuchida et al. |
| 7,328,348 B2 | 2/2008 | Couillard |

(Continued)

FOREIGN PATENT DOCUMENTS

WO  WO2005106711 A1  11/2005

OTHER PUBLICATIONS

Liu et al. "OLAP Realization Technology Research Based on MDX" Presented at the Proceedings of the First International Conference on Machine Learning and Cybernetics, Beijing Nov. 4-5, 2002.*

*Primary Examiner* — Shay S Glass
(74) *Attorney, Agent, or Firm* — Duncan Galloway Egan Greenwald, PLLC; Kevin T. Duncan

(57) ABSTRACT

In one example embodiment, a system and method are shown for receiving data that include a time stamp. The system and method also include building an Online Analytical Processing (OLAP) cube that includes a dimension, the dimension acting as a schema for the data that include the time stamp. The system and method may also include populating the OLAP cube with an object, the object including the data and the time stamp as at least one attribute. The system and method may also include storing the OLAP cube.

22 Claims, 21 Drawing Sheets

(56) References Cited

U.S. PATENT DOCUMENTS

| | | |
|---|---|---|
| 7,330,847 B2 | 2/2008 | Saylor et al. |
| 2003/0061132 A1* | 3/2003 | Yu, Sr. .................. G06Q 30/02 705/30 |
| 2003/0233297 A1* | 12/2003 | Campbell ............. G06Q 10/10 705/31 |
| 2004/0088233 A1* | 5/2004 | Brady .................. G06Q 40/00 705/31 |
| 2005/0055289 A1* | 3/2005 | Mehldahl ............... G06Q 40/12 705/30 |
| 2005/0144192 A1 | 6/2005 | Chkodrov et al. |
| 2005/0278290 A1 | 12/2005 | Bruce et al. |
| 2006/0074741 A1 | 4/2006 | Orumchian et al. |
| 2006/0149778 A1 | 7/2006 | Clover |
| 2006/0167960 A1 | 7/2006 | Lomet |
| 2006/0195492 A1 | 8/2006 | Clark et al. |
| 2007/0203933 A1 | 8/2007 | Iversen et al. |
| 2007/0233644 A1 | 10/2007 | Bakalash et al. |
| 2009/0024660 A1* | 1/2009 | Borgsmidt ........ G06F 17/30592 |
| 2010/0082524 A1* | 4/2010 | Barber .............. G06F 17/30398 707/600 |
| 2011/0288972 A1* | 11/2011 | Brady .................. G06Q 40/00 705/31 |

* cited by examiner

FIG. 2

| Home | Reports | Import | Export | Admin |

ACME International

Jurisdiction                    Quick Navigation [        ] [Enter Data] ▷

| Jurisdiction | Filing | Nexus | Nexus Flow | PL 86-272 | Rule | Apportionment | Rate |
|---|---|---|---|---|---|---|---|
| Arkansas | Combined | ☑ | ☑ | ☐ | General | 4.94125% | 0.069680% |
| Arizona | Separate | ☑ | ☑ | ☐ | General | 5.99402% | 0.065500% |
| California | Separate | ☑ | ☑ | ☐ | General | 5.99402% | 0.088400% |
| Delaware | Separate | ☑ | ☐ | ☑ (204) | General | 5.99402% | 0.087000% |
| ☐ Georgia (202) | Separate | ☑ | ☑ (203) | ☐ | General | 5.99402% (205) | 0.060000% |
| Atlanta (201) | Separate | ☑ | ☑ | ☐ | | 0% | 0.000000% |
| Macon | Separate | ☑ | ☐ | ☐ | | 0% | 0.000000% |
| Columbus | Separate | ☑ | ☐ | ☐ | | 0% | 0.000000% |
| Savannah | Separate | ☑ | ☐ | ☐ | | | |

206

[ Add ] [ Save ] [ Reset ]

Save Status:

| Account | Acme HQ | | | | | | Total |
|---|---|---|---|---|---|---|---|
| | AR 4.94125% | AZ 5.99402% | CA 5.99402% | DE 5.99402% | GA 5.99402% | | |
| | End | End | End | End | End | | End |
| ⊞ Payroll Factor | | | | | | | |
| Salaries & Wages | | | | | | | |
| All Other Payroll | $46,500 | $55,500 | $66,100 | $32,100 | $43,900 | | $244,100 |
| Feeder Payroll | $70,458 | $72,448 | $81,488 | $40,412 | $79,678 | | $346,484 |
| Less Partnership | $0 | $0 | $0 | $0 | $0 | | $0 |
| Other Salaries | $0 | $0 | $0 | $0 | $0 | | $0 |
| Package Car Pay | $95,832 | $97,831 | $99,812 | $71,296 | $90,136 | | $454,907 |
| ⊞ Officers Compensation | | | | | | | |
| Less General | $0 | $0 | $0 | $0 | $0 | | $0 |
| Officer Salaries | $44,500 | $47,500 | $85,500 | $32,200 | $66,800 | | $276,500 |
| ⊞ Sales Factor | | | | | | | |
| Service Income | | | | | | | |
| Services Recipts | $84,562 | $0 | $1,000 | $0 | $9,600 | | $95,162 |
| Subscriber Loc. | $34,200 | $45,800 | $65,300 | $44,300 | $44,500 | | $44,500 |
| ⊞ Rental Income | | | | | | | |

Save Status:

FIG. 4

ACME International — 140

Home | Reports | Import | Export | Admin

Data Entry     Quick Navigation     History Mode

| Account | Acme HQ | | | | | | Total |
|---|---|---|---|---|---|---|---|
| | AR 4.94125% | AZ 5.99402% | CA 5.99402% | DE 5.99402% | GA 5.99402% | | |
| | End | End | End | End | End | | |
| Payroll Factor | | | | | | | |
| ⊟ Salaries & Wages | | | | | | | |
| All Other Payroll | $46,500 | $55,500 | $66,100 | $32,100 | $43,900 | | $244,100 |
| Feeder Payroll | $70,458 | $72,448 ⌐401 | $81,488 | $40,412 | $79,678 | | $346,484 |
| Less Partnership | $0 | $0 | $0 | $0 | $0 | | $0 |
| Other Salaries | $0 | $0 | $0 | $0 | $0 | | $0 |
| Package Car Pay | $95,832 | $97,831 | $99,812 | $71,296 | $90,136 | | $454,907 |
| ⊟ Officers Compensation | | | | | | | |
| Less General | $0 | $0 | $0 | $0 | $0 | | $0 |
| Officer Salaries | $44,500 | $47,500 | $85,500 | $32,200 | $66,800 | | $276,500 |
| Sales Factor | | | | | | | |
| ⊟ Service Income | | | | | | | |
| Services Recipts | $84,562 | $0 | $1,000 | $0 | $9,600 | | $95,162 |
| Subscriber Loc. | $34,200 | $45,800 | $65,300 | $44,300 | $44,500 | | $44,500 |
| ⊟ Rental Income | | | | | | | |

402 — Save | Reset

Save Status:

FIG. 5

History Mode — 140

| Event Details | Date & Time | User | Type | Comment | Attachments |
|---|---|---|---|---|---|
| View... (503) | 2008-03-12 13:43:23 | admin | Account Data | Updated Payroll | |
| View... (504) | 2008-03-12 12:13:21 | admin | Zip File Set | Data set imported (502) | |

501, 201

| Account | Acme HQ | | | | | | Total |
|---|---|---|---|---|---|---|---|
| | AR 4.94125% | AZ 5.99402% | CA 5.99402% | DE 5.99402% | GA 5.99402% | | |
| | End | End | End | End | End | End | |
| Payroll Factor | | | | | | | |
| ⊟ Salaries & Wages | | | | | | | |
| All Other Payroll | $46,500 | $55,500 | $66,100 | $32,100 | $43,900 | | $244,100 |
| Feeder Payroll | $70,458 | $72,448 | $81,488 (506) | $40,412 | $79,678 | | $346,484 |
| Less Partnership | $0 | $0 | $0 | $0 | $0 | | $0 |
| Other Salaries | $0 | $0 | $0 | $0 | $0 | | $0 |
| Package Car Pay | $95,832 | $97,831 | $99,812 | $71,296 | $90,136 | | $454,907 |
| ⊟ Officers Compensation | | | | | | | |
| Less General | $0 | $0 | $85,500 | $0 | $0 | | $0 |
| Officer Salaries | $44,500 | $47,500 | | $32,200 | $66,800 | | $276,500 |

505

Save Status:      Save    Reset

FIG. 7

History Mode — 140

| Event Details | Date & Time | User | Type | Comment | Attachments |
|---|---|---|---|---|---|
| View... | 2008-03-12 13:43:23 | admin | Account Data | Account Denominator | Account Structure |
| View... | 2008-03-12 12:13:21 | admin | Account Data | Account Crude — 701 | |
| View... | 2008-03-12 11:43:23 | admin | Zip File Set | Updated Payroll | |

| Account | Acme HQ | | | | | | | Total |
|---|---|---|---|---|---|---|---|---|
| | AR 4.94125% | AZ 5.99402% | CA 5.99402% | DE 5.99402% | GA 5.99402% | | | |
| Property Factor | End | End | End | End | End | | | |
| ⊟ Inventory | | | | | | | | |
| Crude Product — 702 | $111 — 201 | $1,111 | $111 | $111 | $111 | | | $0 |
| Denominator Inv. | $70,458 | $72,448 | | | | Account History | | $346,484 |
| Inventories | $0 | $0 | $ | Date & Time — 704 | User | Value | | $0 |
| Numerator Inv. | $95,832 | $97,831 | $ | 2008-03-12 12:13:21 | admin | $111 | | $454,907 |
| Materials | | | $ 703 | 2008-03-12 11:43:23 | admin | $61,149 | | |
| ⊟ Land | | | | | | | | |
| Land Other | $0 | $0 | $ | | | | | $0 |
| Land Lease | $44,500 | $47,500 | | | | | | $276,500 |
| | | | | | | Save | | Reset |

Save Status:

ONLINE ANALYTIC PROCESSING CUBE WITH TIME STAMPING

CROSS REFERENCE TO RELATED APPLICATIONS

This is a non-provisional patent application claiming priority under 35 USC §119(e) to U.S. Provisional Patent Application No. 61/038,745, filed on Mar. 22, 2008, entitled, "ONLINE ANALYTIC PROCESSING CUBE WITH TIME STAMPING," which is incorporated by reference in its entirety.

TECHNICAL FIELD

Example embodiments relate generally to the technical field of data management, and in one specific example, to a system and a method for time stamping data.

BACKGROUND

As companies continue to strive for efficiency, consistency and flexibility, computers and software executed on computers are increasingly relied upon to automate, semi-automate, enhance, quicken and make reliable and uniform business processes. As a result of rapidly expanding and increasingly cost-effective data storage and management capabilities and ever-increasing bandwidth in data communications, the appetite for increasingly robust software programs with greater access and use of business data has grown. Tax data may often be stored in computer databases where various operations may be readily performed upon the data, using the vast processing power of today's computer systems. A variety of tax software may assist individual or corporate accountants to prepare accurate tax documents. Many tax software applications are capable of importing required financial data related to accounts from databases of various financial institutions such as banks, mortgage companies, investment institutes, etc.

The convergence of SOX 404 and FASB Interpretation No. 48 (FIN 48) presents tax departments with an unprecedented level of process, documentation, and control requirements. To ensure compliance with FIN 48, tax departments are faced with the need to create a controlled and auditable environment that supports: processes and controls around managing tax positions across the entire organizational structure, all jurisdictions, and over multiple years; the development of a comprehensive inventory of tax positions (certain and uncertain) and balances; judgments regarding the technical merits of the positions; measurement of the appropriate impact to be reported in the financial statements; detailed documentation to be tracked for supporting the judgments around positions and their measured benefit; and new and substantive financial statement disclosures. In addition, with FIN 48, the assessment of the inventory of tax positions is a continual process. With each quarterly financial reporting cycle, decisions regarding the technical merits and proper measurements must be reevaluated, thus requiring the ability to capture and track ongoing analysis, approvals, and related documentation supporting decisions made throughout the process. What is needed is a system that addresses these process, control, and documentation requirements by providing a secure, controlled framework for identifying, evaluating, measuring, and reporting on tax positions—across entities, jurisdictions, and periods—in accordance with FIN 48 and other standards. Existing spreadsheet-based systems and document management tools fall short of facilitating multiple layers of decision making, reducing manual effort, supporting internal controls, and complementing existing tax provision processes. A need exists for a system to help companies comply with the process, documentation, and control requirements of FIN 48; streamline the preparation for, and process of, financial audits; reduce risk, increase accuracy, and improve tax department efficiency and effectiveness; adhere to company-defined SOX 404 controls and FIN 48 processes through a highly configurable, secure, and fully auditable framework.

SUMMARY OF THE INVENTION

In one exemplary embodiment, the invention provides a computer-implemented method for performing tax calculations. The method includes: receiving data that includes a time stamp, the data for use in performing tax calculations; building an Online Analytical Processing (OLAP) cube that includes a dimension, the dimension acting as a schema for the data that includes the time stamp; populating the OLAP cube with an object, the object including the data and the time stamp as at least one attribute; storing the OLAP cube; and using the OLAP cube to perform tax calculations and to generate a tax related data set, whereby using a time-based criteria the OLAP cube may be restored at a later date and after modifications to the data have occurred. In addition, the method may include modifying the data to create modified data, the modifying categorized as an event; and associating an additional time stamp with the modified data to reflect a time of the event; and/or storing the event into an event history, the event history including a time of the event. The data may represents a first data version and the modified data may represent a second data version and the OLAP cube may represent a first OLAP cube version, with the method further comprising: building a second OLAP cube version by populating the second OLAP cube version with an object that includes the second data version and the additional time stamp; and using the second OLAP cube version to perform tax calculations and to generate a second tax related data set different from the first tax related data set. The method may further include building a plurality of OLAP cube versions respectively using a plurality of data versions to respectively generate a plurality of tax related data sets and/or using a time-based criteria to selectively build one of the plurality of OLAP cube versions based on time-stamp data associated with the plurality of data versions.

In second exemplary embodiment, the invention provides a computer-implemented method for performing tax calculations, the method comprising: retrieving an Online Analytical Processing (OLAP) cube populated with an object, the object including a time attribute and a data attribute; performing a tax related calculation using the OLAP cube and data retrieved from the data attribute, the calculation reflecting the data at a time defined by the time attribute; and displaying a result of the calculation associated with the time, the result including a tax related data set. The method may further comprising performing a second calculation using the data retrieved from the data attribute, the second calculation reflecting the data at a second time defined by a second time attribute.

In yet another exemplary embodiment the invention provides a computer system for processing tax related data in performing tax calculations, the system comprising: a receiver to receive tax related data that includes a time stamp; a cube building engine to build an Online Analytical Processing (OLAP) cube that includes a dimension, the dimension acting as a schema for the tax related data that includes the time stamp; an object population engine to populate the OLAP cube with an object, the object including the tax related data and the time stamp as at least one attribute; a storage engine to store the OLAP cube; and a processor adapted to use the OLAP cube to perform tax calculations and to generate a tax related result data set. The computer system may, after the tax related dated has been modified, utilize the processor to receive and process a time-based criteria to cause the cube building engine to build the OLAP cube using pre-modified tax related data based at least in part on the time stamp to thereby perform tax calculations to generate the tax related data set.

In yet another exemplary embodiment, the invention provides a computer system for processing tax related data in performing tax calculations, the system comprising: a cube retrieval engine to retrieve an Online Analytical Processing (OLAP) cube populated with an object, the object including a time attribute and a data attribute; a tax calculation engine to perform a tax related calculation using tax related data retrieved from the data attribute, the tax related calculation reflecting the tax related data at a time defined by the time attribute; and a display to display a tax related result of the calculation associated with the time. The tax calculation engine may perform a second tax calculation, the second tax calculation uses the tax related data retrieved from the data attribute, and the second tax calculation reflects the tax related data at a second time defined by a second time attribute. In addition, the time and the second time may be part of an event history for the tax related data, the event history including a history of modifications made to the tax related data.

In yet another exemplary embodiment, the invention provides an apparatus comprising: means for retrieving an Online Analytical Processing (OLAP) cube populated with an object, the object including a time attribute and a data attribute; means for processing the OLAP cube to and performing a tax calculation using tax related data retrieved from the data attribute, the tax calculation reflecting the tax related data at a time defined by the time attribute; and means for displaying a tax related result of the tax calculation associated with the time.

In yet another exemplary embodiment the invention provides a machine-readable medium comprising instructions, which when implemented by one or more machines, cause the one or more machines to perform the following operations: retrieve an Online Analytical Processing (OLAP) cube populated with an object, the object including a time attribute and a data attribute; perform a tax calculation using tax related data retrieved from the data attribute, the tax calculation reflecting the tax related data at a time defined by the time attribute; and display a tax related result of the tax calculation associated with the time. The machine-readable medium instructions may also be adapted to perform the additional operation of performing a second tax calculation using modified tax related data, the second tax calculation reflecting the modified tax related data at a second time defined by the time attribute.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference. Some embodiments are illustrated by way of example and not limitation in the figures of the accompanying drawings in which:

FIG. 2 is a diagram of a Graphical User Interface (GUI), according to an example embodiment, illustrating a jurisdiction in which an entity files jurisdiction-specific tax data.

FIG. 3 is a diagram of a GUI, according to an example embodiment, illustrating a data entry page for a selected entity and a selected jurisdiction.

FIG. 4 is a diagram of a GUI, according to an example embodiment, illustrating changes made to data included in the OLAP cube.

FIG. 5 is a diagram of a GUI, according to an example embodiment, illustrating selectable event history for validated data.

FIG. 7 is a diagram of a GUI, according to an example embodiment, illustrating a history of changes for cells in a table of an OLAP cube.

DETAILED DESCRIPTION

Figure 1:
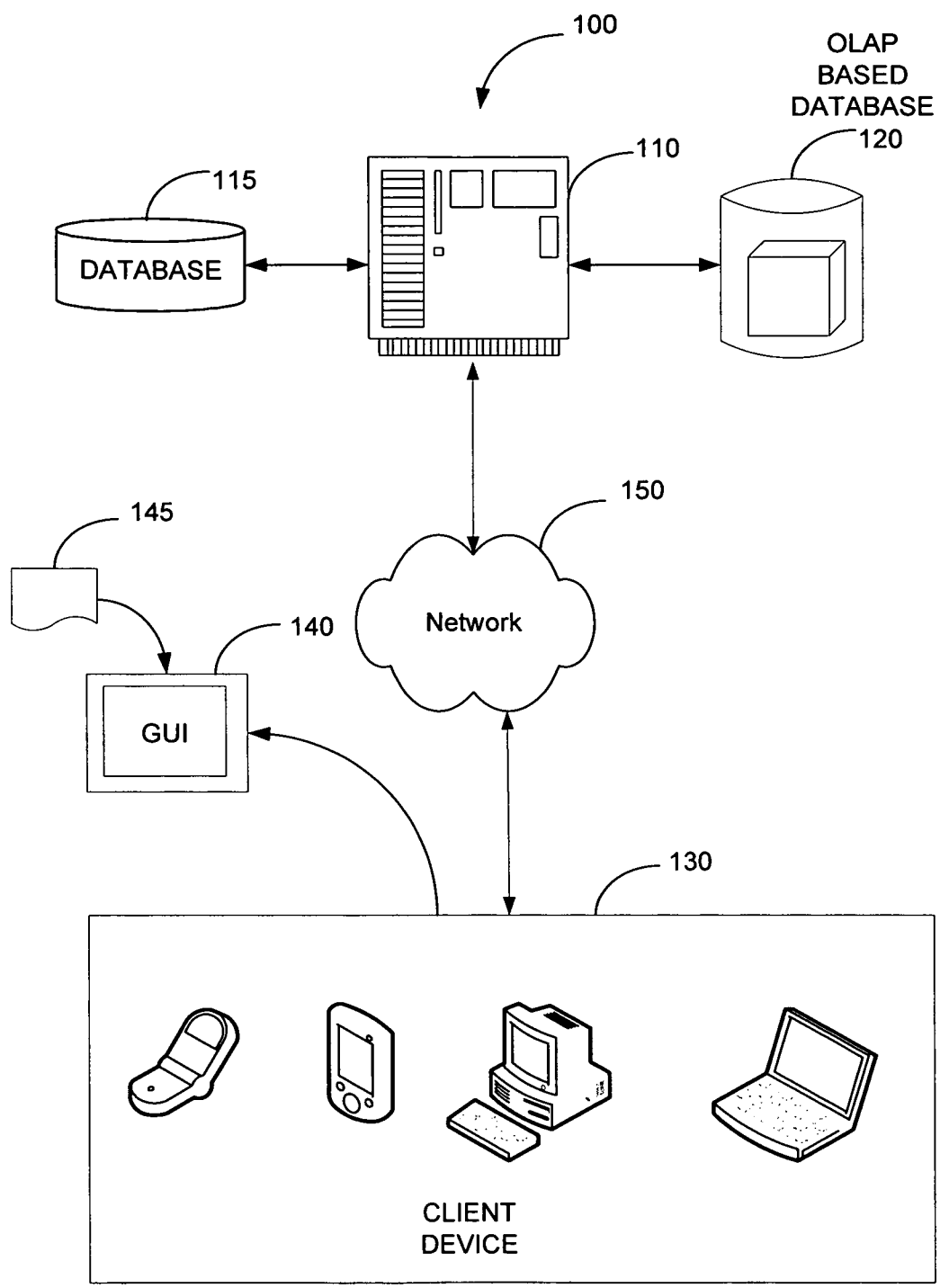
FIG. 1 is a diagram illustrating a system, according to an example embodiment, for the real-time generation of an Online Analytical Processing (OLAP) cube.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

In some example embodiments, a system and method is shown to establish a historical-factual basis for data. Data as used herein is validated data. Validated data include the data that have been examined by a person (e.g., a tax professional such as an auditor, Certified Public Accountant (CPA), or a Chief Financial Officer (CFO)) who certifies the data as valid with or without modifications. Certification may be in the form of tendering an opinion with regard to the data as to its validity. For example, if a tax auditor would like to see the history of how a certain piece of data has been updated over time, then an OLAP cube, as illustrated herein, is queried, and calculations (e.g., tax calculations) are performed using the data stored in this OLAP cube. These calculations reflect the validated data as it was understood at a particular point in time by a person (e.g., a natural person or legal entity) associated with the data.

Some example embodiments include the generating of a snap shot or "version" of the validated data as it was understood at some point in time, which is meant to include not only time of day but also calendar day or date including month, day and year or any combination thereof. This may be done by "time-stamping" individual items of data or sets of such data items from initiation and through modifications over time. Each snap shot or version, and data included therein, is used to perform calculations and may produce results attributable to and associable with that version and that "time." The result of these calculations is used to understand certain historical business decisions of those (e.g., persons running a business) associated with the validated data and to track and reproduce the data, calculations and perhaps basis for the results. In this manner, the invention may be used to over time create a plurality of versions of OLAP cube, data, and results, which may then be at a later date recreated without the need to discretely save each data set and OLAP cube build. In one manner, the invention provides a way to build an OLAP cube using a time-based criterion, effectively recreating the cube, data, and results that would have been generated based on data as it existed at the selected point in time, like a virtual time-machine for data. Given that there are very large amounts of data associated with tax accounting and other applications and that conditions change over time (e.g., additional/fewer/different entities as a result of acquisition, sale, restructuring, etc. over time) the present invention provides an efficient and effective system for 1) making real-time calculations and generating results, and 2) recreating the data and conditions that existed as of a particular point in time to build an OLAP cube consistent with those previous conditions. This is especially powerful in the areas of tax and accounting wherein filings are made with certain assumptions or rules and over time, for example due to rulings and audit decisions, etc., the data is modified to reflect changing conditions. An entity often is faced with the daunting task of going back to support earlier filings only to find that because data has been modified and/or other conditions have changed it may be costly, time-consuming and perhaps impossible to recreate the data and conditions that were valid at some point in time. The OLAP cube and related techniques herein allow entities to efficiently, and in a largely automated or semi-automated fashion, retrace its footsteps along the tax filing path. This can be done for companies comprising many legal entities with many subsidiaries, business units operating in a plurality of jurisdictions, including states and countries, and having thousands of tax related filings In some example embodiments, a system and method is shown for generating and using time stamped data within an OLAP cube. This OLAP cube is part of a tax apportionment data system, wherein data for this OLAP cube is time stamped so as to determine the status of the data used in a tax-related calculation. This status is related to what data was considered valid data at a particular point in time. Further, time stamping allows for users to examine this data on a historical basis to discern the historical-factual basis for certain tax calculations.

Some example embodiments illustrated herein include building a number of dimensions for an OLAP cube using validated data. The method includes configuring the OLAP cube based on the dimensions. Multiple aggregated data sets are generated and stored in a memory. Analytical processing of the OLAP cube data is performed based on one or more queries received from a client device.

In some example embodiments, through the use of the methods shown below, a historical-factual basis for validated data is established. This historical-factual basis has many uses. For example, if a tax auditor would like to see the history of how a certain data point has been updated over time, then the OLAP cube illustrated herein is queried, and calculations (e.g., tax calculations) performed using the data stored in this OLAP cube. These calculations reflect the data point as it was understood at a particular point in time by a person (e.g., a natural person or legal entity) associated with the data.

In an example embodiment, the updating of the cube includes attaching documents to a fact data. For example, a user may attach a legal opinion, a tax-related opinion, a section of the tax law, or other documents to a calculated tax item that has used that tax-related opinion or section of the tax law. The time stamping of the attachment is performed by generating an attachment record with attributes shown in the attachment table of Table 7, such as a TIMESTAMP attribute indicating a time when the attachment occurred.

Example System

FIG. 1 is a high-level diagram depicting an example embodiment of a system 100 for real-time generation of an OLAP cube. In some example embodiments, the system 100 shown herein is part of a tax apportionment data management system. The system 100 includes an application server 110, a relational database 115, and an OLAP based database 120 linked via a network 150. This network 150 includes the Internet, a Local Area Network (LAN), a Wide Area Network (WAN), or some other network of a suitable topology. Additionally, connected to the network 150 is a client device 130 (e.g., a desktop computer, a laptop computer, a Personal Data Assistant (PDA), a cell phone, or other suitable networkable device).

The connection between the client device 130 and the application server 110 may be a physical or logic connection utilizing one or more protocols outlined in the Transmission Control Protocol (TCP)/Internet Protocol (TCP/IP) stack model, or Open Systems Interconnection (OSI) model. The application server 110 may provide users of the client device 130 with a GUI 140 as rendered by the client device 130. This GUI 140 may be a browser application (e.g., INTERNET EXPLORER™, or FIREFOX™) that interprets and renders web pages served up directly or indirectly by the application server 110. Alternatively, the GUI 140 may be used as part of a stand-alone implementation of the system 100 and method shown herein. A stand-alone application includes the functionality of the system and method shown herein and the functionality of the GUI 140 residing on the same computer system.

In example embodiments, the application server 110 receives a number of data objects (e.g., including or relating to validated data) from the users. The application server 110 stores the facts in the database 115. The facts relate to a corporate tax account, an investment portfolio, an administrative documentation, etc. The users create event histories by updating and validating facts through editing one or more attributes included in the facts at various times. Each event history may consist of a number of records. The user also selects a document 145, using the GUI 140, and associates the document 145 with an event history record. In an alternative example embodiment, the user may import from another system or database, or generate the document themselves.

The application server 110 builds a number of dimensions (e.g., entity dimension, accounts dimension, jurisdiction dimension, tax-rule dimension, etc.) of a tax accounts OLAP cube, using validated data stored in the database 115. The application server 110 configures the OLAP cube based on the dimensions. The application server 110 generates multiple aggregated sets of data (e.g., data associated with a fiscal year aggregated from data stored for various quarters of that fiscal year or sales in a region such as Europe aggregated from the sales data of various European countries). The application server 110 also performs analytical processes (e.g., calculations on one or more sets of OLAP cube data). Calculation results are stored in a memory (e.g., a Random Access Memory (RAM) of the application server 110). The calculations are performed based on one or more queries received from a client device 130.

In one example embodiment, the GUI 140 is used to receive updated tax data for use in an OLAP cube. This updated tax data is time stamped, as is more fully illustrated below. This updated tax data may be provided by a tax professional or other suitable person.

In some example embodiments, the GUI 140 is used to display web pages including data relating to a tax apportionment management system. This functionality may include executing an "Enter Data" button, the use of a "History Mode" button and associated panel, and a variety of other functionalities. A button may be a screen object or widget.

Example Interface

FIG. 2 is a diagram of the GUI 140 illustrating a list of jurisdictions in which an entity files income taxes, along with jurisdiction-specific data, such as the overall apportionment percentage. In some example embodiments, a graphical pointer 201, controlled by an input device, is used to select certain functionality that is displayed as part of the GUI 140. A graphical pointer is a cursor. An input device includes a mouse, keyboard, light pen, touch screen, or other suitable input device. Select includes the execution of a right-click function, a mouse-over function, or a left-click function, through the use of the input device. Further, the input device is used to focus upon the functionality that is displayed as part of the GUI 140. Focus indicates the component of the GUI 140 which is currently selected to receive input. The functionality may be embodied in a GUI object or widget. A widget is an element of a GUI that displays an information arrangement changeable by the user, such as a check box, window or a text box. Here the graphical pointer 201 is used to execute a widget 202 that is used to expand or collapse data appearing on a screen. The data here relates to jurisdictions (e.g., the state of Georgia) and tax data associated with jurisdictions (e.g., jurisdiction-specific data). Check boxes 203 and 204 are used to select certain functionality associated with the jurisdiction. For example, through the selection of the check box 204, the taxing regime associated with the United States Federal Interstate Income Tax Law (P.L. 86-272) can be applied to jurisdiction data. An over-all tax apportionment percentage is shown in field 205, showing tax apportionment on a per state basis. Additionally, an enter data button 206 is shown that, when executed using the graphical pointer 201, causes a next data entry screen (see e.g., FIG. 3) to be shown.

FIG. 3 is a diagram of the GUI 140 illustrating a data entry page for a selected entity (e.g., Acme International), and selected jurisdictions in which this entity transacts business. In some example embodiments, through the selection of a tab 301, a panel is opened where a user can change those selections and customize what data the user sees and can enter. The graphical pointer 201 can be used to select the tab 301. Also shown is a display of the calculated apportionment percentages for each jurisdiction. In some example cases, the apportionment percentages can be emphasized for viewing (see e.g., 302). This emphasis for viewing may be in the form of bolding, italicizing, highlighting, or through the application of some other form of emphasis to the apportionment percentage.

FIG. 4 is a diagram of a GUI 140 illustrating changes made to data included in the OLAP cube. In some example embodiments, using the graphical pointer 201, data may be entered into a row or column of the GUI 140. Here data is entered at 401. Once entered, the data is saved into the database 115, or OLAP based database 120, through the execution of the save button 402. Further, the data that is entered or otherwise modified is emphasized for viewing.

FIG. 5 is a GUI 140 illustrating a selectable event history for validated data. Shown is the graphical pointer 201 that is used to select a button 501. Through the selection of the button 501, an event history is selected. Event histories may be scrolled through using the up arrow 503 or down arrow 504. An event history summary is displayed at row 502. The data in this row includes the user who made a change, comments by the user making the change, the time and date of the change, and the type of the change. Table 505 displays a break out of the event history and the specifics of the data associated with the event history. For example, at entry 506 an update is shown for the data as of a particular point in time. In addition, cells that were changed as part of an event are emphasized for viewing. In addition, the apportionment percentages are updated by re-calculating them using the input data as of that specific time.

Figure 6:
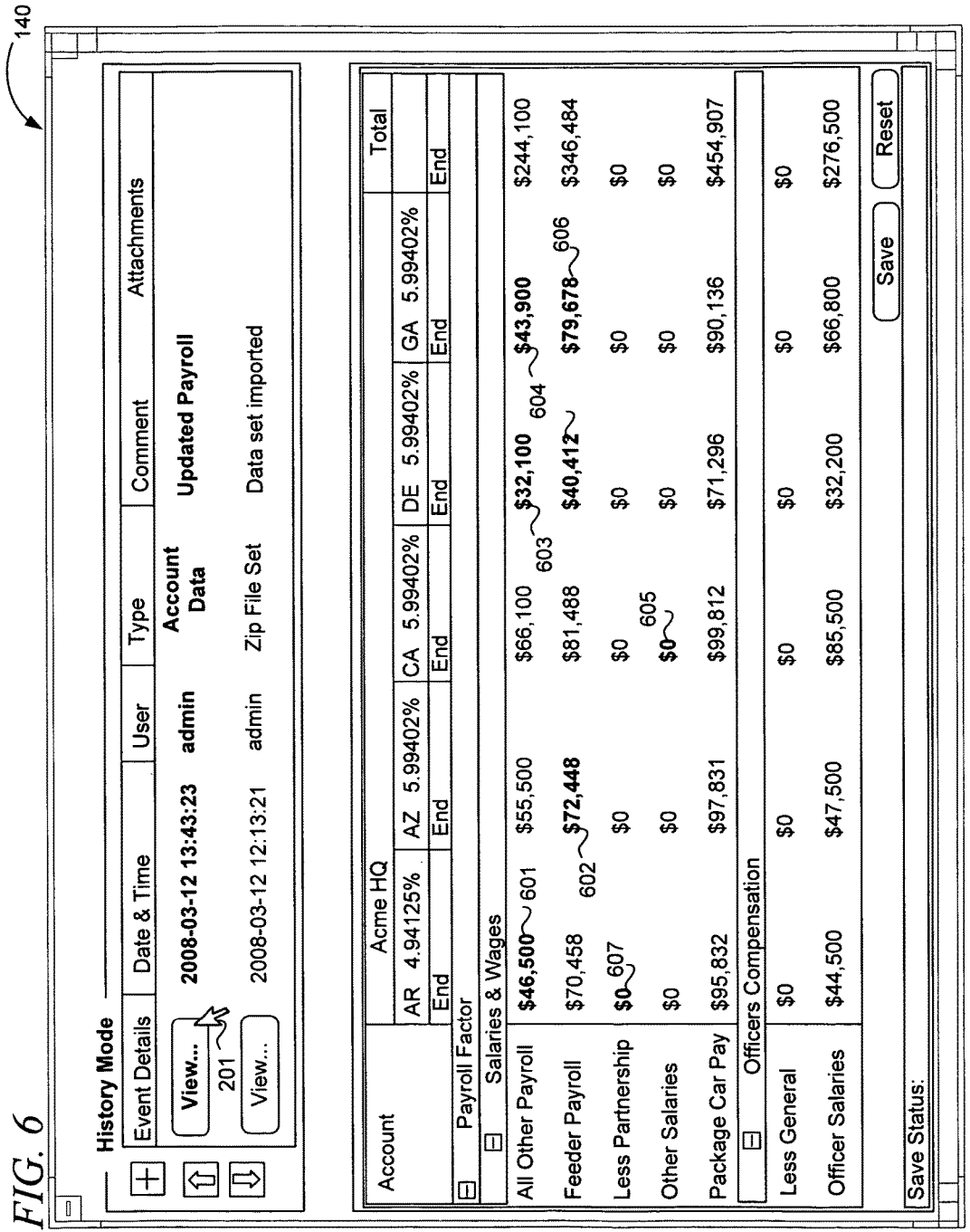
FIG. 6 is a diagram of a GUI, according to an example embodiment, illustrating the editing of validated data.

FIG. 6 is a GUI 140 illustrating the editing of validated data. Shown are various edits 601-607 for an event. Each edit is emphasized. Further, each edit is facilitated through the use of the graphical pointer 201. These edits may be saved into the database 115 or the OLAP based database 120. When doing so, the event history may be updated.

FIG. 7 is a GUI 140 illustrating the history of change for cells in a table that is part of a dimension in an OLAP cube. In some example embodiments, a row 701 is selected using the graphical pointer 201. Further, a row 702 is selected and an edit history for this row displayed. This edit history is displayed in the popup 703. Included in the popup 703 is an entry 704 showing the edit history (e.g., a complete history of changes) for the data displayed in the row 702. In some example embodiments, every cell of a row has a hyperlink associated with it that, when executed, displays the edit history for the row.

Figure 8:
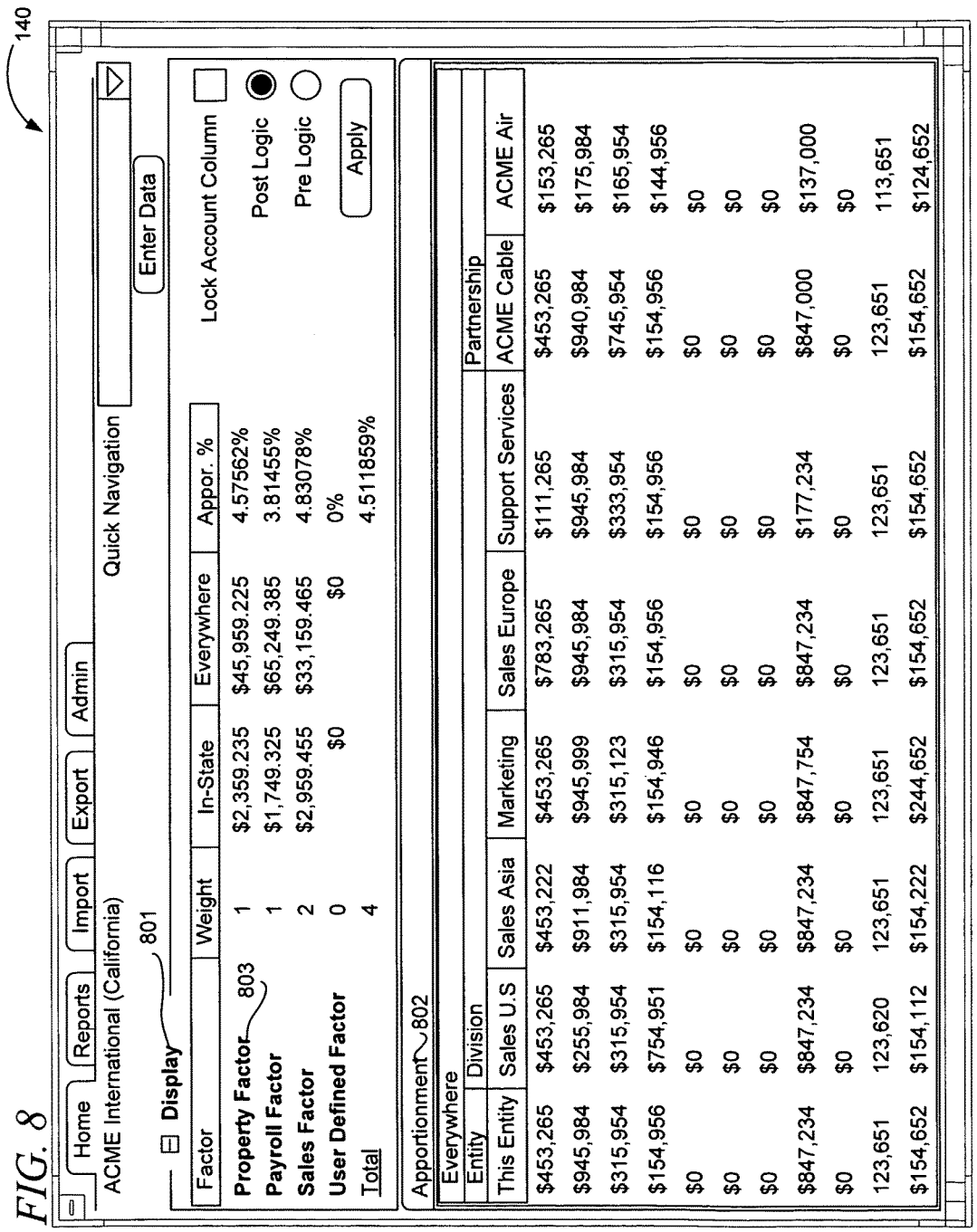
FIG. 8 is a diagram of a GUI, according to an example embodiment, illustrating calculated apportionment factors.

FIG. 8 is a GUI 140 illustrating apportionment factor calculations. In some example embodiments, the graphical pointer 201 (not shown) is used to execute a jurisdiction heading at 801, where a screen is shown that explains the details of how, for example, the apportionment factors (see 802) are calculated. The user can display the details for a specific factor (e.g., at 803) by clicking on its link.

While the detailed description may focus on application of the invention in the context of standard apportionment of taxable income across multiple jurisdictions, e.g., multiple states in which a tax-paying entity operates, the invention and techniques discussed herein may also be applied to the computation of federal taxable income, to the adjustment of such income to state basis, and to special apportionment computations.

Special apportionment is distinguishable from standard apportionment, which is the process where federal taxable income adjusted to state basis is split and "apportioned" among various states based on the percentage of sales, property and payroll that occurred or is located in the various states. The sales, property and payroll in each given state are essentially divided by the total sales, property and payroll to determine the share of federal taxable income adjusted to state basis attributed to each of the particular states. In contrast, special apportionment is the process of apportioning a given item of sales, property, payroll or other factor before including it in the state's factor numerator. A driver used in the apportionment computation (e.g., the number of subscribers in each state when apportioning cable subscriber revenue of a cable system operating across multiple states, or the number of landings taking place in each state when apportioning an airline's sales) may be referred to as a special apportionment method. The dollar value of an item that must be apportioned across states (e.g., in the previous examples, cable subscriber revenue or airline sales) may be captured in a special apportionment account. An account may be associated with a legal entity (e.g., a corporation), a sub-entity (e.g., a service or a product line within a corporation), a flow-through entity (e.g., a partnership), etc. The result of the special apportionment calculation is then used as an input to the standard apportionment calculation.

The concept of special apportionment is particularly relevant in cases where the assignment of some sales, property and payroll items to a particular state is not obvious. In such cases, the states typically allow a number of different special apportionment methods to be used. Special apportionment therefore provides an extra opportunity for a company to ensure that the most advantageous combination of special apportionment methods is employed to minimize tax liability across a plurality of entities and jurisdictions. The present invention may further be used in conjunction with optimization techniques, such as described in U.S. Patent Publications 2003/0195780 (Arora et al.), 2008/0147527 (McIntyre et al.), 2007/0198390 (Lazear et al.), and 2007/0282761 (Deputy et al.) all of which are incorporated herein by reference.

In operation, the system may be concerned with four dimensions, with special apportionment methods/rules being treated as a separate dimension. Multiple cubes may then be built in processing the various data and rules to arrive at the amount of each special apportionment account apportioned to each state in each entity. One exemplary process is 1) identify accounts subject to special apportionment and load the amounts subject to special apportionment in the different entities into a two-dimensional cube having entities and special apportionment accounts as dimensions; 2) establish or build a three-dimensional cube having jurisdictions, special apportionment accounts, and special apportionment methods as dimensions; 3) using 1) and 2) build a three-dimensional output cube comprised of entity, jurisdiction and special apportionment account dimensions that contains the amount of the accounts from 1) spread across states using the special apportionment methods specified in 2). The special apportionment methods to be used and associated with each jurisdiction specified in 2) may be as directed or specified by the respective state or may be selectable to greatest tax advantage by the entity.

In addition to use in US federal and state tax, the invention and systems described herein are intended for use in the computation of foreign taxes and foreign tax credits. Typically, taxable income in each country is not determined by apportioning worldwide income across countries. Rather, each country taxes the income earned by an entity in that country and some of the income earned by foreign branches and subsidiaries of the entity (either at the time such income is earned or at the time it is remitted or distributed to the parent). In one example, the present invention may be used in an international context by configuring an OLAP cube with jurisdiction, account, and entity dimensions. The jurisdiction dimension of the OLAP cube will be comprised of countries rather than the individual U.S. states. In one alternative, for example in the case of a U.S. entity, the jurisdiction dimension may have both countries (U.S. and foreign) as well as political subdivisions of these countries (such as U.S. states and German "Lander"). The entity dimension may include not only legal entities, e.g., corporations and partnerships, but also "branches" or "permanent establishments" of such legal entities in the different countries. In operation, the system may be used to build multiple OLAP cubes, e.g., one for the U.S. and one for foreign. In the alternative, one comprehensive OLAP cube may be configured that includes U.S. and foreign entities, jurisdictions, accounts, etc. An international tax rules dimension may be built to process the various tax rules of the countries and may be applied in a separate cube.

The European Union is considering implementing an apportionment-type system in Europe. In that case, the state apportionment techniques described herein may be applied in the context of European situation The time-stamping function associated with the OLAP cube and system disclosed herein may be particularly beneficial to companies that are involved in audits on a routine basis to help establish to the various tax authorities that at the time of the filings the data used to arrive at the tax filing was the proper data for use at that time. For example, if a federal tax ruling results in some adjustment, such as disallowance of a deduction, then federal taxable income will increase. As a result, a later calculation of state tax liability may yield a liability that differs from the one obtained when the entity originally filed its state return. It is important for companies to be able to track versions of data, including income data, entity data (for example over time additional entities may be formed), etc. to ensure compliance and avoid penalties, fines and the like.

Example Logic

Figure 9:
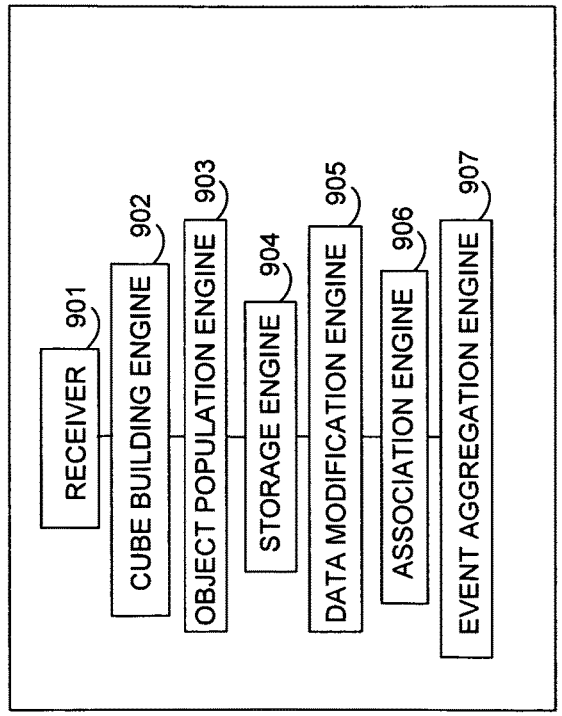
FIG. 9 is a block diagram of a computer system, according to an example embodiment, that is used to generate an OLAP cube with time stamped data stored as an event history.

FIG. 9 is a block diagram of an example computer system 900 that is used to generate an OLAP cube with time stamped data stored as an event history. The blocks shown herein may be implemented in software, firmware, or hardware. These blocks may be directly or indirectly communicatively coupled via a physical or logical connection. The computer system 900 may be the application server 110. Shown are blocks 901 through 907. Illustrated is a receiver 901 to receive data that includes a time stamp. Communicatively coupled to the receiver 901 is a cube building engine 902 to build an OLAP cube that includes a dimension, the dimension acting as a schema for the data that includes the time stamp. Communicatively coupled to the cube building engine 902 is an object population engine 903 to populate the OLAP cube with an object, the object including the data and the time stamp as at least one attribute. Communicatively coupled to the object population engine 903 is a storage engine 904 to store the OLAP cube. Communicatively coupled to the storage engine 904 is a data modification engine 905 to modify the data to create modified data, the modification categorized as an event. Communicatively coupled to the data modification engine 905 is an association engine 906 to associate an additional time stamp with the modified data to reflect the time of the event. Communicatively coupled to the association engine 906 is an event aggregation engine 907 to store the event into an event history, the event history including the time of the event. In some example embodiments, the OLAP cube is stored into Random Access Memory (RAM). In some example embodiments, the dimension includes at least one of an entity dimension, an account dimension, or a jurisdiction dimension.

Figure 10:
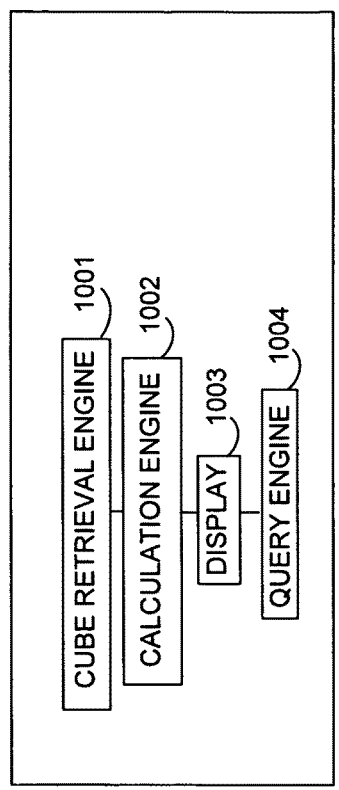
FIG. 10 is a block diagram of a computer system, according to an example embodiment, that is used to perform calculations using data and associated time stamps and event histories.

FIG. 10 is a block diagram of an example computer system 1000 that is used to perform calculations using data and associated time stamps and event histories. The blocks shown herein may be implemented in software, firmware, or hardware. These blocks may be directly or indirectly communicatively coupled via a physical or logical connection. The computer system 1000 may be one of the client devices 130. Shown are blocks 1001 through 1004. Illustrated is a cube retrieval engine 1001 to retrieve an OLAP cube populated with an object, the object including a time attribute and a data attribute. Communicatively coupled to the cube retrieval engine 1001 is a calculation engine 1002 to perform a calculation using data retrieved from the data attribute, the calculation reflecting the data at a time defined by the time attribute. Communicatively coupled to the calculation engine 1002 is a display 1003 to display a result of the calculation for the time. In some example embodiments, the calculation engine 1002 performs a second calculation, the second calculation using the data retrieved from the data attribute, and the second calculation reflecting the data at an additional time defined by an additional time attribute. In some example embodiments, the time and the additional time are part of an event history for the data, the event history including a history of modifications made to the data. Additionally, in some example embodiments, the OLAP cube includes dimensions that include at least one of an entity dimension, an account dimension, or a jurisdiction dimension. Communicatively coupled to the display 1003 is a query engine 1004 to query the OLAP cube through the use of a Multidimensional Expression (MDX) language.

Figure 11:
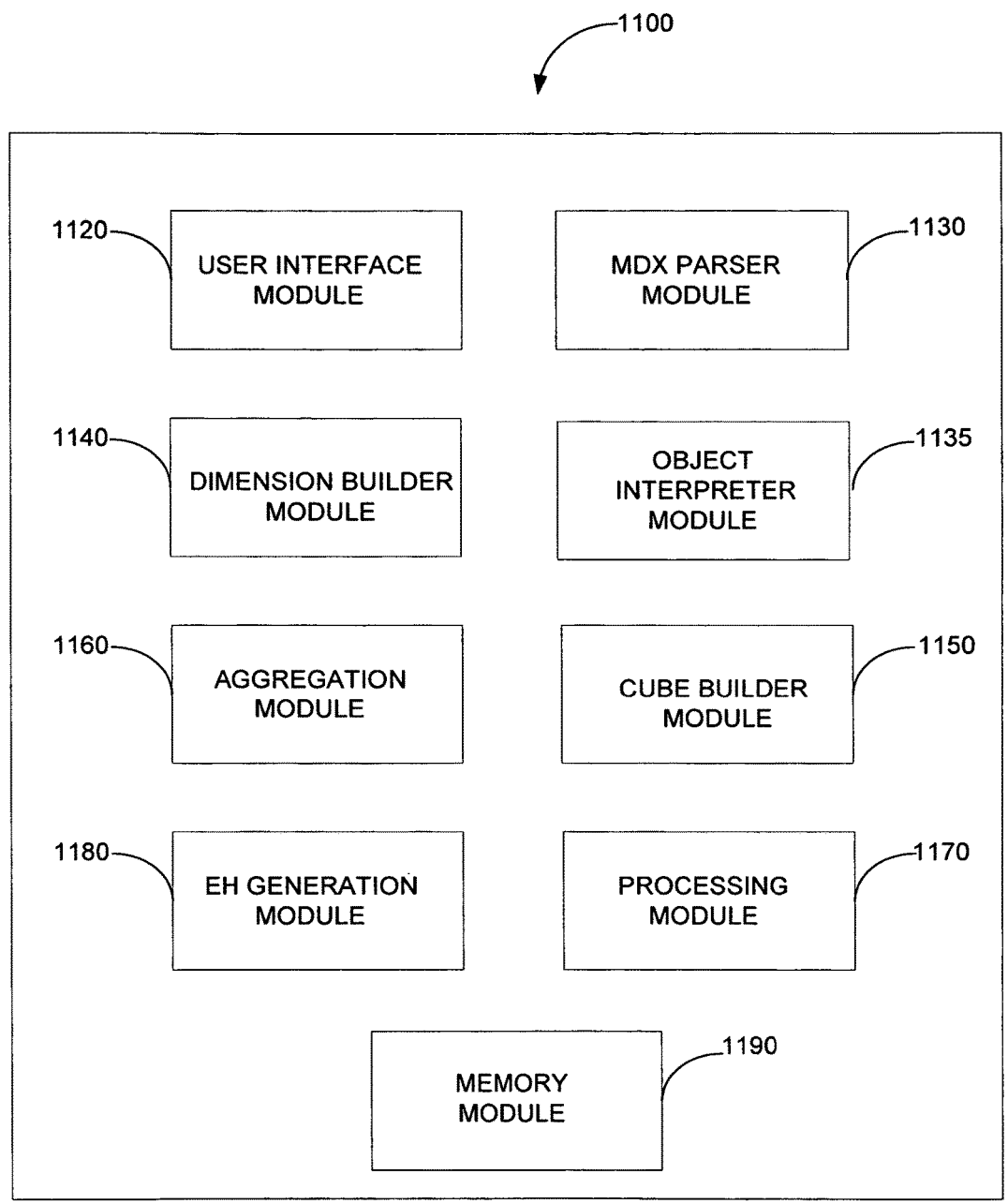
FIG. 11 is a block diagram of a computer system, according to an example embodiment, for real-time generation of an OLAP cube that includes time stamped data.

FIG. 11 is a block diagram illustrating an example embodiment of a system 1100 for real-time generation of an OLAP cube that includes time stamped data. The various blocks outlined in FIG. 11 may be implemented in software, hardware, or firmware. Additionally, these blocks may be implemented as part of the aforementioned application server 110, client device 130, or some other suitable device. The system 1100 may include a user interface module 1120, an MDX parser 1130, an object interpreter module 1135, a dimension builder module 1140, a cube builder module 1150, an aggregation module 1160, a processing module 1170, an Event History (EH) generating module 1180, and a memory module 1190.

Figure 19:
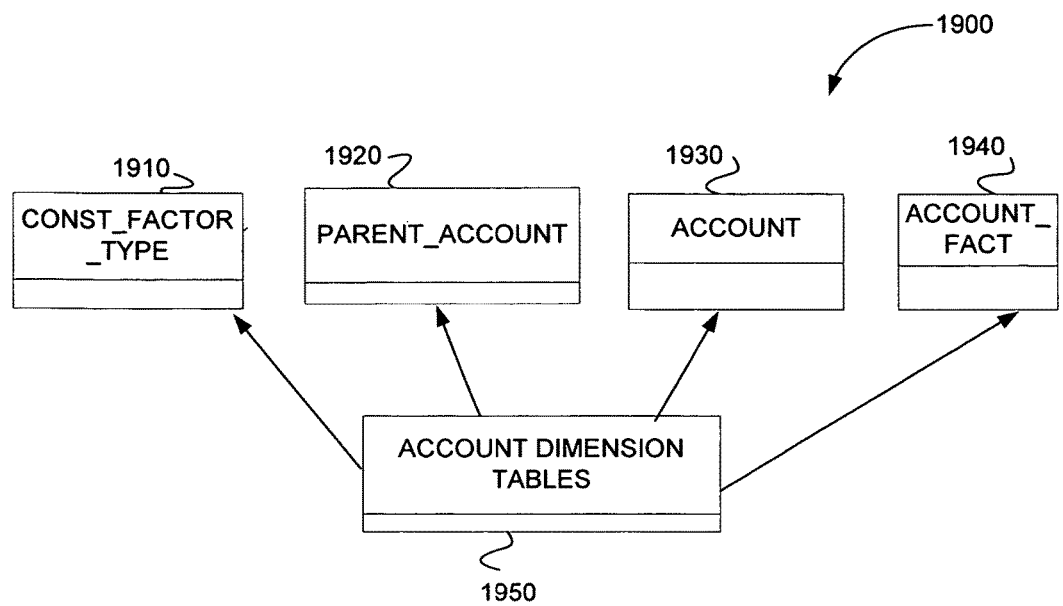
FIG. 19 is database schema illustrating, according to an example embodiment, various tables associated with an account dimension of an OLAP cube.

In example embodiments, the dimension builder module 1140 creates a number of dimensions for an OLAP cube using the validated data stored in the database 115. The OLAP cube has three primary dimensions. The three primary dimensions of the tax accounts OLAP cube, for example, include accounts, entities and jurisdictions. Each dimension includes a number of tables. As shown in FIG. 19 below, the accounts dimension includes a const-factor-type table 1910, a parent-account table 1920, an account table 1930, and an account-fact table 1940, which may be aggregated to account dimension tables 1950. The structure of the account dimension tables 1950 is shown in Table 2 below.

In some example embodiments, the entity dimension includes an entity table 2010, an entity-fact table 2020, and a group-fact table 2030, forming entity dimension tables 2050 (see FIG. 20 below). The detailed structure of these tables is seen in Table 4 below. Each dimension may include a number of members having attribute tables. For example, the members of the entity dimension tables 2050 may include an entity-filing table 2150, a group-filing table 2130, a group-member-fact table 2120, an ownership table 2110, an ownership percentage table 2140, and a flow-through-rule-fact table 2160, aggregated under members of entity dimension attribute tables 2170 shown in FIG. 21 below. The attributes of these tables are shown in Table 5 below. Attributes of the jurisdiction dimension are provided in Table 2 below.

Returning to FIG. 11, in some example embodiments, user interface module 1120 has functionality similar to display 1003. "Similar" includes "the same as." Additionally, dimension builder module 1140 has functionality similar to association engine 906. Object interpreter module 1135 has functionality similar to object population engine 903. Aggregation module 1160 is similar to event aggregation engine 907. Cube builder module 1150 is similar to cube retrieval engine 1001 and cube building engine 902. EH generating module 1180 is similar to data modification engine 905. Processing module 1170 is similar to calculation engine 1002. Memory module 1190 is similar to storage engine 904.

Figure 12:
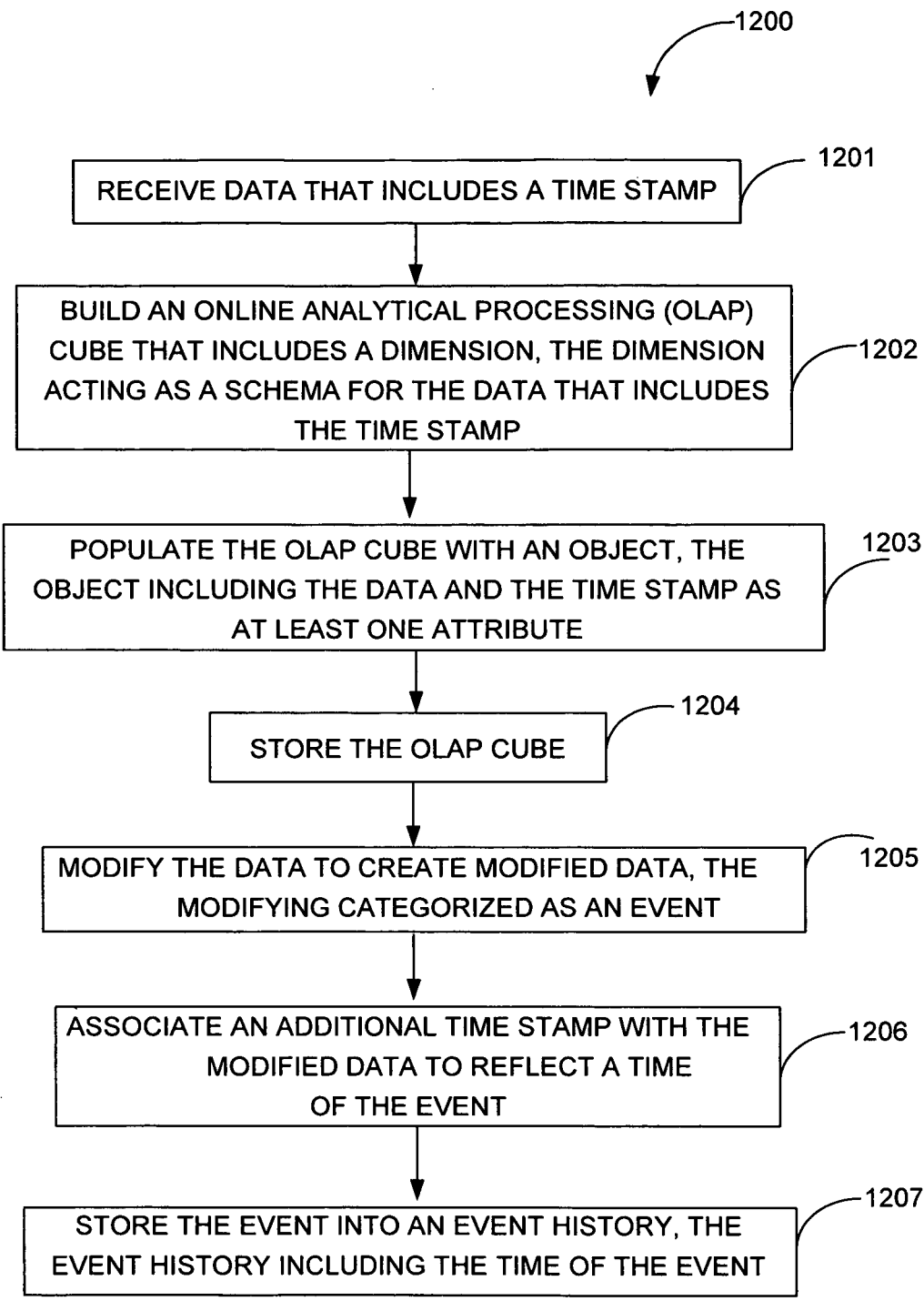
FIG. 12 is a flow chart illustrating a method, according to an example embodiment, used to generate and store an OLAP cube with time stamping and an event history.

FIG. 12 is a flow chart illustrating an example method 1200 used to generate and store an OLAP cube with time stamping and an event history. Shown are various operations 1201 through 1207 that may be executed upon the application server 110. Shown is an operation 1201 that, when executed, receives data that includes a time stamp. Operation 1202 is executed to build an OLAP cube that includes a dimension, the dimension acting as a schema for the data that includes the time stamp. Operation 1203 is executed to populate the OLAP cube with an object, the object including the data and the time stamp as at least one attribute. Operation 1204 is executed to store the OLAP cube. Operation 1205 is executed to modify the data to create modified data, the modifying categorized as an event. Operation 1206 is executed to associate an additional time stamp with the modified data to reflect a time of the event. Operation 1207 is executed to store the event into an event history, the event history including the time of the event. In some example embodiments, the OLAP cube is stored into RAM. Further, in some example embodiments, the dimension includes at least one of an entity dimension, an account dimension, or a jurisdiction dimension.

Figure 13:
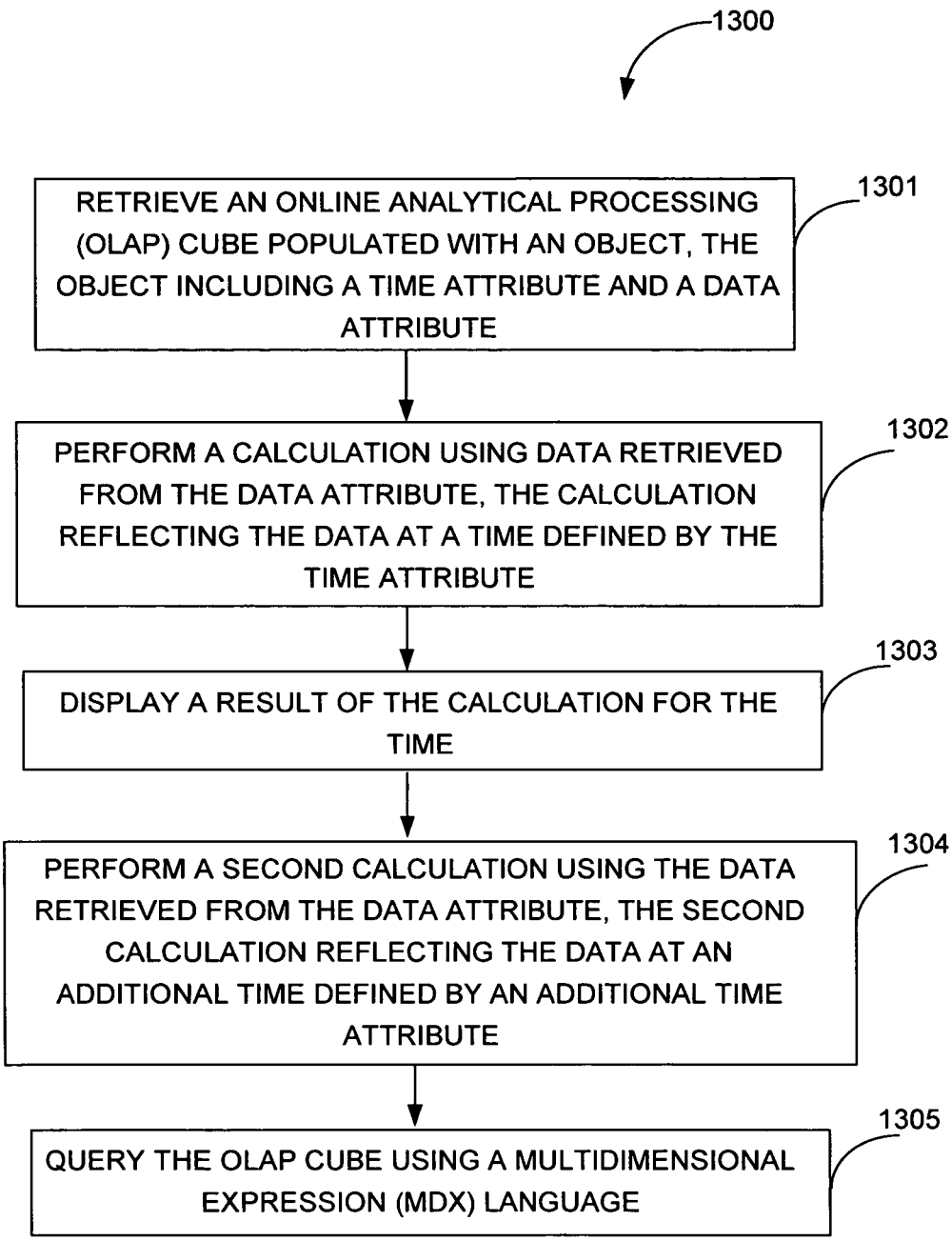
FIG. 13 is a flow chart illustrating a method, according to an example embodiment, used to perform calculations on time stamped data within an OLAP cube so as to generate a snapshot of the data.

FIG. 13 is a flow chart illustrating an example method 1300 used to perform calculations on time stamped data within an OLAP cube so as to generate a snapshot of the data. Shown are various operations 1301 through 1305 that may be executed upon the client devices 130. Shown is an operation 1301 that, when executed, retrieves an OLAP cube populated with an object, the object including a time attribute and a data attribute. Operation 1302 is executed to perform a calculation using data retrieved from the data attribute, the calculation reflecting the data at a time defined by the time attribute. Operation 1303 is executed to display a result of the calculation for the time. Operation 1304 is executed to perform a second calculation using the data retrieved from the data attribute, the second calculation reflecting the data at an additional time defined by an additional time attribute. In some example embodiments, the time and the additional time are part of an event history for the data, the event history including a history of modifications made to the data. Moreover, in some example embodiments, the OLAP cube includes dimension that include at least one of an entity dimension, an account dimension, or a jurisdiction dimension. Operation 1305 is executed to query the OLAP cube using the MDX language.

Figure 14:
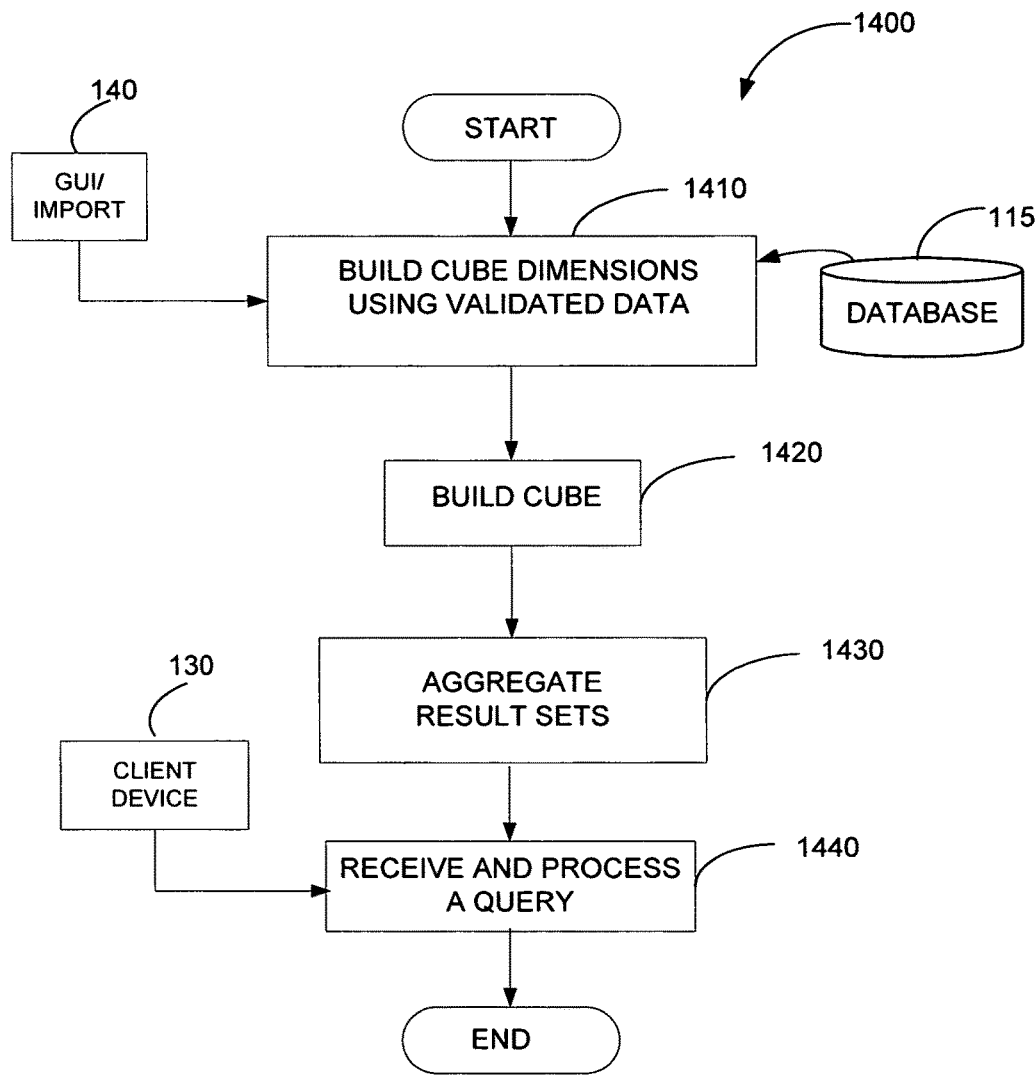
FIG. 14 is a flow chart illustrating a method, according to an example embodiment, for the real-time generation and accessing of an OLAP cube.

FIG. 14 is a flow chart illustrating an example method 1400 for real-time generation and accessing of an OLAP cube. Operations 1410 through 1430 may be executed by the application server 110. Operation 1440 may be executed by one or more of the client devices 130, or the application server 110. In example embodiments, the method 1400 is initiated at operation 1410, where the dimension builder module 1140 builds cube dimensions (e.g., accounts, entities, and jurisdictions) using validated data. At operation 1420, the cube builder module 1150 configures an OLAP cube, such as the tax accounts OLAP cube, using the built dimensions (e.g., accounts, entities and jurisdictions). Since the data used to build the dimensions are validated data, the OLAP cube built using those dimensions may also be a validated OLAP cube.

At optional operation 1430, the aggregation module 1160 aggregates sets of data to generate collective data sets. For example, the aggregation module 1160 aggregates an entity table, an entity-fact table, and the group-fact table to obtain the entity dimension tables (see FIG. 20 below). At operation 1440, the user interface module 1120 receives one or more queries from the client device 130. The queries may be parsed by the MDX parser module 1130 to identify input data and a set of demanded data from the queries' contents.

According to an example embodiment, the processing module 1170 performs a number of calculations and stores the results in RAM before receiving queries. In this example embodiment, when a query is received from a user, the processor selects the desired result from the stored results and makes it available to the user interface module 1120 to present the result to the user.

Figure 15:
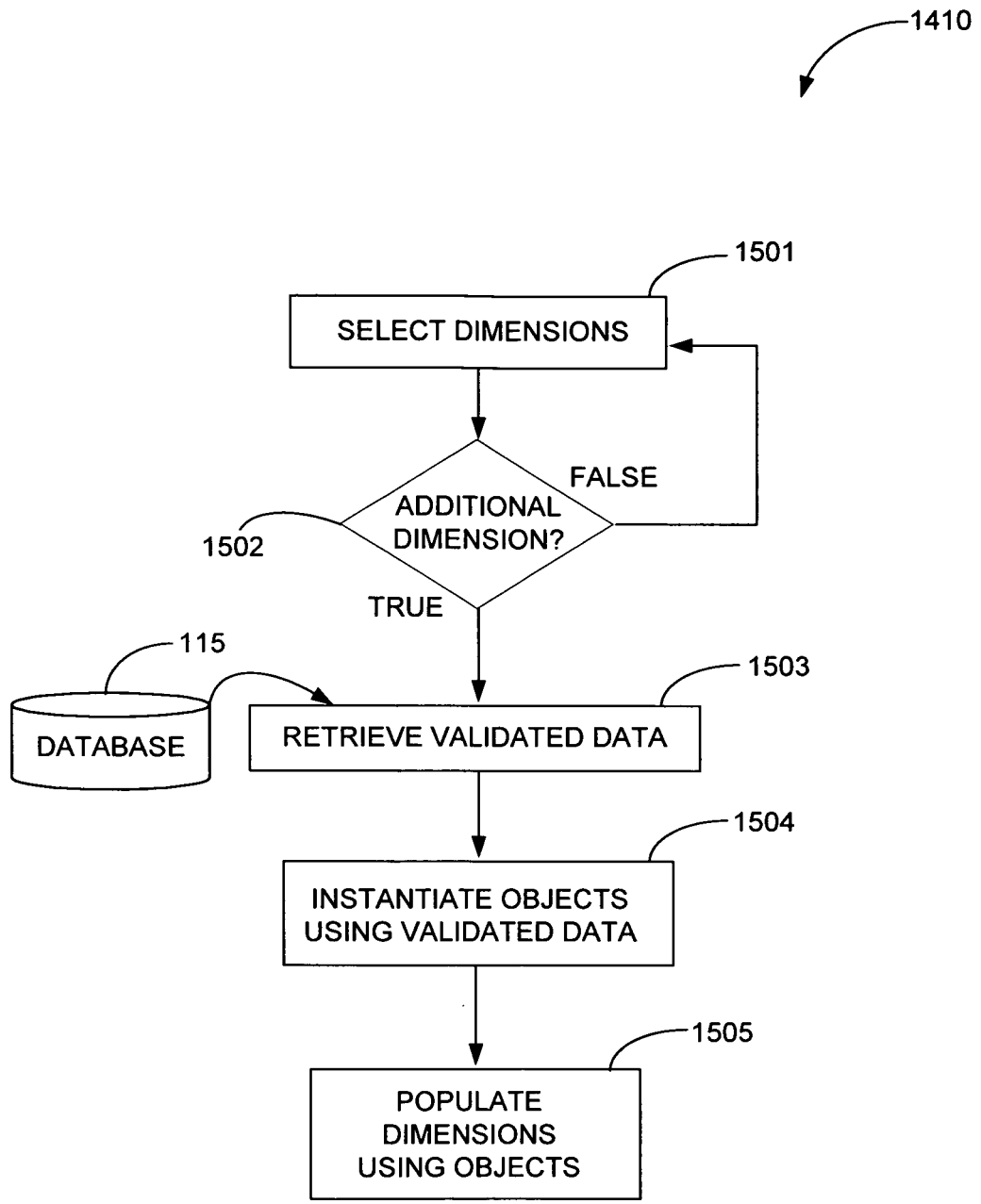
FIG. 15 is a flow chart illustrating an operation, according to an example embodiment, to build cube dimensions (e.g., accounts, entities, and jurisdictions) using validated data.

FIG. 15 is a flow chart illustrating an example operation 1410. Shown is an operation 1501 that, when executed, receives selection input to select dimensions to be used to build an OLAP cube. These dimensions may include an account dimension, entity dimension, or a jurisdiction dimension. A decisional operation 1502 is executed to determine whether additional dimensions have been selected. In cases where decisional operation 1502 evaluates to "false," the operation 1501 is re-executed. In cases where decisional operation 1502 evaluates to "true," an operation 1503 is executed. Operation 1503 is executed to retrieve validated data from the database 115. Operation 1504 is executed to instantiate an object or objects using the retrieved validated data. In some example embodiments, the object(s) includes an attribute (e.g., data), and a method that may utilize the attribute. This data may include a time stamp of other event history data. Operation 1505 is executed to populate the dimension with the object(s). The object(s) may be an entry in a table that is part of the dimension, where the object(s) is referenced via a unique ID value.

Figure 16:
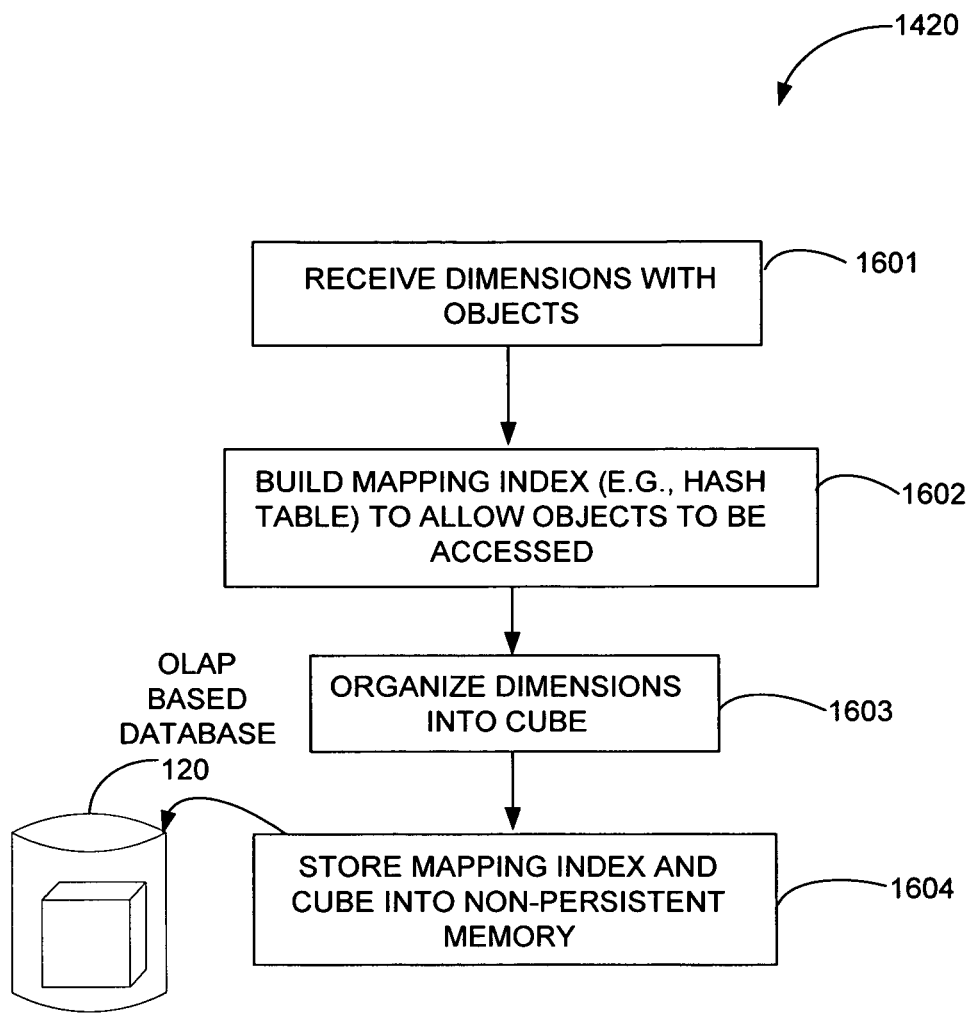
FIG. 16 is a flow chart illustrating an operation, according to an example embodiment, to configure an OLAP cube using the built dimensions (e.g., accounts, entities and jurisdictions).

FIG. 16 is a flow chart illustrating an example operation 1420. Shown is an operation 1420 that includes an operation 1601. Operation 1601, when executed, receives a dimension with an object or objects. Operation 1602 is executed to build a mapping index to allow the object(s) in the dimension to be accessed. A mapping index may be a hash table, binary search tree, or some other suitable data structure that allows for amortized $\Theta(1)$, or $\Theta(n \log n)$ performance. In one example embodiment, a hash table includes a unique ID value for the object(s) as a key value to be used to access the dimension. This unique ID value may be numeric value such as an integer, or an alpha-numeric value such as a string that allows for the object(s) to be distinguished from another object. Access to the object(s) included in the dimension may be via a pointer, referent, or some other value that refers directly to another value stored elsewhere in the memory of a computer. Operation 1603 is executed to organize the dimension along with other dimensions into an OLAP cube. Operation 1604 is executed to store the mapping index and OLAP cube into some type of non-persistent memory such as RAM. In some example embodiments, the mapping index and OLAP cube are stored into some type of persistent memory such as the OLAP based database 120.

Figure 17:
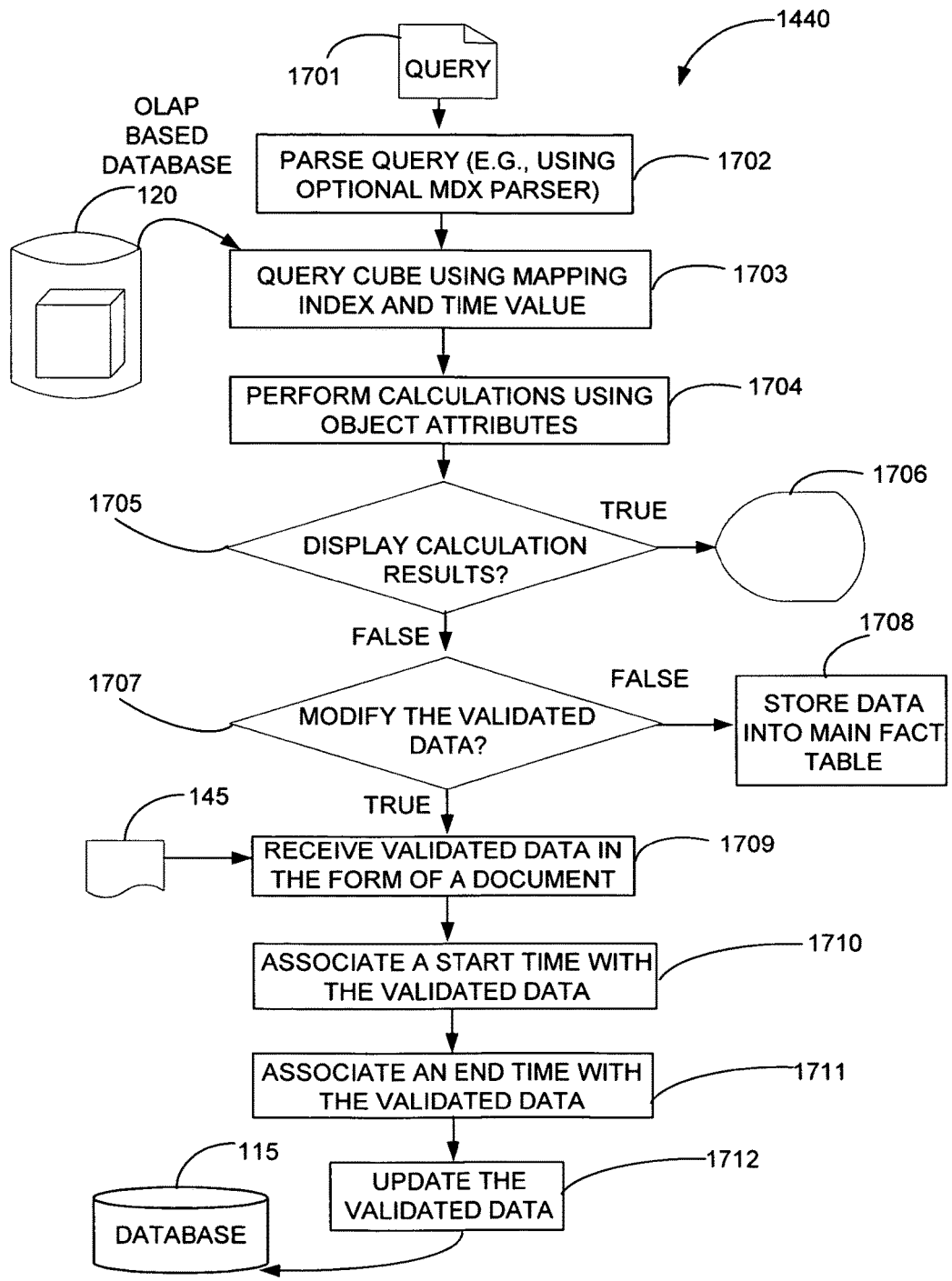
FIG. 17 is a flow chart illustrating an operation, according to an example embodiment, to use the user interface module to receive one or more queries from the client device.

FIG. 17 is a flow chart illustrating an example operation 1440. Shown is an operation 1702 that, when executed, parses a query 1701. This query 1701 may be an MDX based query requesting information from an OLAP cube. Further, this query 1701 identifies an object ID and time. Operation 1703 is executed to query an OLAP cube using the query 1701 in conjunction with the mapping index and time value. Operation 1704 is executed to perform calculations using the attributes of the object retrieved based upon the object ID and time value. This calculation may be a tax calculation, accounting calculation, or some other suitable type of calculation. A decisional operation 1705 is shown that determines whether the results of the calculation should be displayed in the GUI 140. In cases where decisional operation 1705 evaluates to "true," the calculation results are displayed in a display 1706 that is part of the GUI 140. A display is a frame or sub-frame of a display area. In cases where decisional operation 1705 evaluates to "false," a further decisional operation 1707 is executed. Decisional operation 1707 determines whether the validated data has been modified. Validated data is modified where the object including the validated data, or the validated data itself is changed, examined, reviewed, or accessed. In cases where decisional operation 1707 evaluates to "false," an operation 1708 is executed to store the validated data into a dimension included in the OLAP cube. In cases where decisional operation 1707 evaluates to "true," an operation 1709 is executed. Operation 1709 is executed to receive validated data in the form of the document 145. In some example embodiments, the validated data is received from another source such as exported from a database, provided by a user, or from some suitable other source. Operation 1710 is executed to associate a start time with the validated data, denoting the time during which the data is valid. Operation 1711 is executed to associate an end time with the validated data, denoting a time after which the validity of the data can no longer be assumed. Operation 1712 is executed to update the database 115 with the modified validated data.

Figure 18:
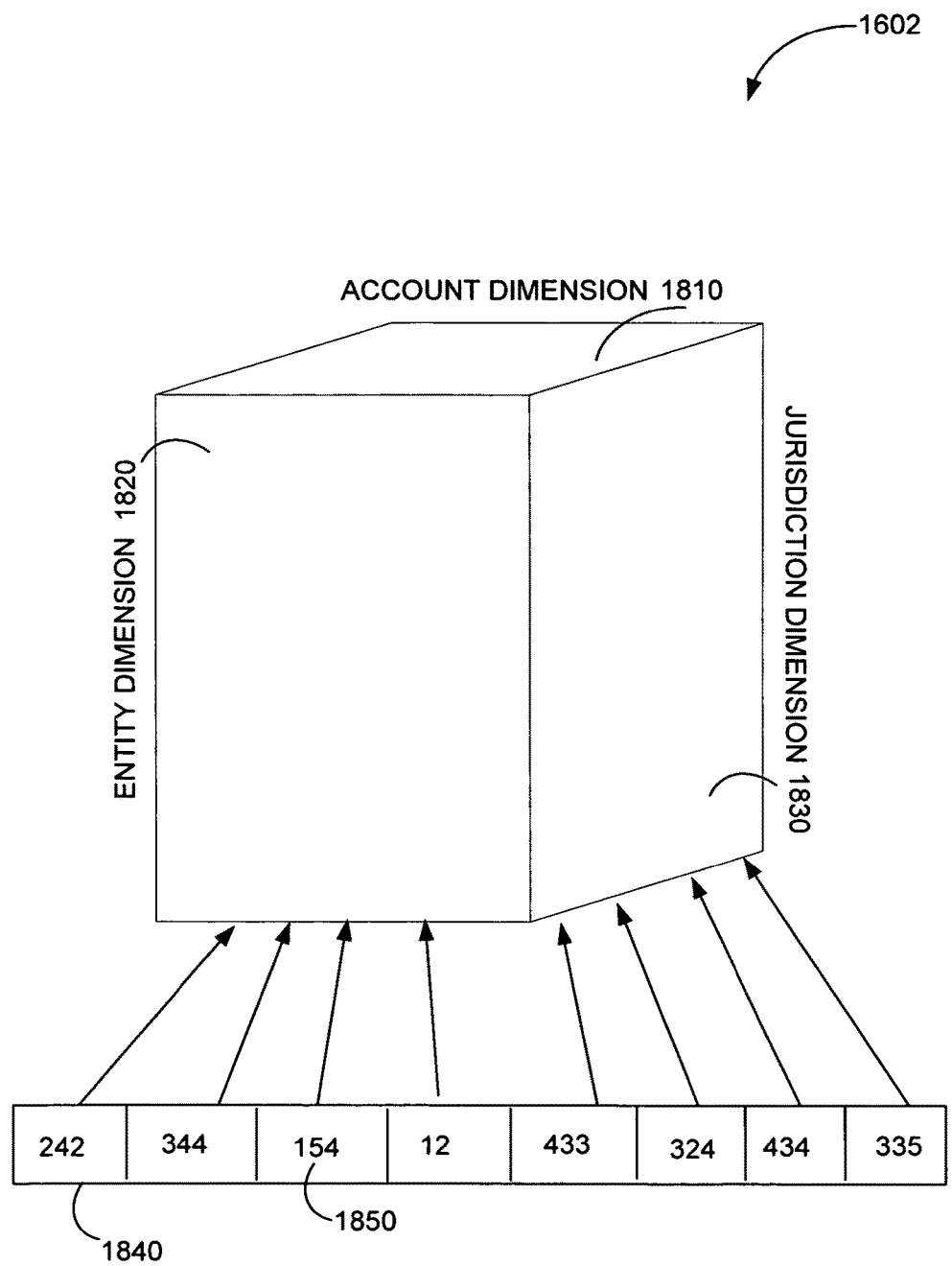
FIG. 18 is a diagram of the relationship of various data structures resulting from the execution of an operation, according to an example embodiment, to build a mapping index to allow the object in the dimension to be accessed.

FIG. 18 is a diagram of the relationship of various data structures resulting from the execution of operation 1602. Illustrated is an OLAP cube with an account dimension 1810, entity dimension 1820, and jurisdiction dimension 1830.

Mapped to this OLAP cube is a hash table 1840 that includes at least one the object IDs 1850. These object IDs 1850 are used to access the OLAP cube and object(s) included therein. These object IDs may be a pointer, referent, or other suitable way to access the object. This hash table serves as a mapping index to the OLAP cube.

Example Database

Some embodiments may include the various databases (e.g., databases 115 and 120) being relational databases, or in some cases as OLAP based databases. In the case of relational databases, various tables of data are created and data is inserted into, and/or selected from, these tables using a Structured Query Language (SQL), or some other database-query language known in the art. In the case of OLAP databases, one or more multi-dimensional cubes or hyper-cubes including multidimensional data from which data is selected from or inserted into, using MDX or some object-based query language, may be implemented. In the case of a database using tables and SQL, a database application such as, for example, MYSQL™, SQLSERVER™, Oracle 81™, 10G™, or some other suitable database application may be used to manage the data.

In the case of a database using cubes and MDX, a database using Multidimensional Online Analytic Processing (MOLAP), Relational Online Analytic Processing (ROLAP), Hybrid Online Analytic Processing (HOLAP), or some other suitable database application may be used to manage the data. These tables, or cubes made up of tables, in the case of, for example, ROLAP, may be organized into a RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd normal form or some other normalization optimization algorithm known in the art.

In example embodiments, the various modules and methods outlined above are used to build and access an OLAP cube that has an event history associated with the validated data included in the OLAP cube. In some example embodiments, the user interface module 1120 receives a number of facts (e.g., an account data fact, from users of the application server 110). The users may provide these facts directly to the application server 110, or via a web-based link using the GUI 140. The GUI 140 may also be generated and supported by the user interface module 1120. The facts may also be imported to the application server from the database 115. The user may update and validate data (e.g., facts, fact tables, and fact attributes) stored in the database 115. The example account data facts include a number of attributes (e.g., JURISDICTION_ID, ENTITY_ID, PARENT_NAME, etc.), and each attribute has characteristics such as data-type, nullable, and primary key, as shown in Table 1 below. In an example embodiment, the JURISDICTION_ID and ENTITY_ID use foreign keys that link ACCOUNT_DATA_FACTS with tables associated with jurisdiction and entity dimensions, respectively.

TABLE 1

Main Fact Table
ACCOUNT_DATA_FACT

| Column | Data-type | Nullable | Primary Key |
|---|---|---|---|
| JURISDICTION_ID | VARCHAR2(255) | No | 1 |
| ENTITY_ID | VARCHAR2(255) | No | 2 |
| PARENT_NAME | VARCHAR2(255) | No | 3 |
| FACTOR | NUMBER(10, 0) | No | 4 |
| ACCOUNT_NAME | VARCHAR2(255) | No | 5 |
| ACCOUNTDATATYPE | NUMBER(10, 0) | No | 6 |
| TRANSACTIONTIMEEND | TIMESTAMP(6) | No | 7 |
| YEAR | NUMBER(10, 0) | No | 8 |
| TRANSACTIONTIMESTART | TMESTAMP(6) | Yes | |
| BEGINVALUE | FLOAT | No | |
| ENDVALUE | FLOAT | No | |
| EVENTID | NUMBER(10, 0) | Yes | |

In some example embodiments, a TRANSACTIONTIMEEND attribute is provided that includes the ending time that data (e.g., data in the form of a tuple) was entered into Table 1. Further, a TRANSACTIONTIMESTART attribute is provided that includes the start time that data (e.g., data in the form of a tuple) was entered into Table 1. Collectively, these two attributes outline the time period during which data was valid. In some example embodiments, a BEGINVALUE and an ENDVALUE attribute are provided. The BEGINNING VALUE and ENDVALUE attributes may reflect the value of a fact data entry (e.g., data in the form of a tuple) for a corresponding time period during which the fact data was valid (e.g., existed as validated data). Additionally, in some example cases, tuple entries for the BEGINNING VALUE and ENDVALUE attributes may be cumulatively updated with previous tuple entries. These tuple entries may include data relating to tax data. This updating may include the modification of a field of a data structure. Collectively, the TRANSACTIONTIMEEND and TRANSACTIONTIMESTART may provide a historical basis for data included in the BEGINVALUE and ENDVALUE.

TABLE 2

Jurisdiction Dimension Table
JURISDICTION

| Column | Datatype | Nullable | Primary Key |
|---|---|---|---|
| ID | VARCHAR2(255) | No | 1 |
| NAME | VARCHAR2(100) | No | |
| ISEXCLUDEDFROMNEXUSCOUNT | NUMBER(1, 0) | Yes | |
| ISUSED | NUMBER(1, 0) | Yes | |
| PARENTJURISDICTION | VARCHAR2(255) | Yes | |

The dimension builder module 1140 may also build another example dimension (e.g., tax rule dimension, for the tax accounts OLAP cube). Example attributes of this member are shown in Table 6 below. In an example embodiment, the dimension builder module 1140 may load the data to be used for each dimension in to the memory module 1190 (e.g., a random access memory in the application server 110 or the client device 130).

Returning to FIG. 11, the users may update data in the database 115 by editing or validating the data or by attaching documents to facts. For each updating event, the EH generating module 1180 may generate an event history record. Event histories and attachments may include attributes, examples of which are shown in Table 7 below. In an example embodiment, an updated cube (e.g., a current cube) may have an event history showing the EVENT_TIME_STAMP attribute set to MAX_TIME. The MAX_TIME may include a maximum allowable date in the database specified by the vendor providing the database.

The cube builder module 1150 may use the dimensions built by the dimension builder module 1140 to configure the tax accounts OLAP cube. Once the OLAP cube is built, it may be saved in the OLAP based database 120 of FIG. 1. The aggregation module 1160 may generate aggregate sets of data. According to an example embodiment, portions of the tax accounts OLAP cube may be aggregated, and/or entity filings for a corporate entity may be aggregated. The aggregation module 1160 may also aggregate various data tables. For example, the aggregation module 1160 may aggregate an event history table 2210 with the attachment table 2220 to form the event history and attachment tables 2230 (see FIG. 22).

In example embodiments, the user interface module 1120 may receive one or more queries from the client device 130. The user interface module 1120 may pass these queries to the MDX parser module 1130. The MDX parser module 1130 may parse the queries to identify various input data contents of the query. The query may demand a number of data elements that may be non-existing in the database 115 and 120. The processing module 1170 may calculate the non-existing data elements, based on the stored data in an OLAP cube, according to one or more procedures or methods.

According to an example embodiment, the object interpreter module 1135 may translate the MDX queries into an object query, so that the processing module 1170 may perform calculations based on objects. In an example embodiment, the processing module 1170 may store the results in the memory module 1190. The processing module 1170 may discard intermediary data resulting from various calculations, thereby saving large amounts of storage space (e.g., the volume of intermediary data may often amount to more than 10 times the results). In other words, any data that is derivable from the input data may not be saved.

FIG. 19 is a database schema 1900 illustrating, according to an example embodiment, various tables associated with an account dimension of an OLAP cube. The account dimension tables may include the const-factor-type table 1910, the parent-account table 1920, the account table 1930, and the account-fact table 1940, which may be aggregated to the account dimension tables 1950. Table 3 shows the structure of the account dimension tables 1950.

TABLE 3

Account Dimension Tables

| Column | Datatype | Nullable | Primary Key |
|---|---|---|---|
| CONST_FACTOR_TYPE | | | |
| CODE | NUMBER | No | 1 |
| NAME | VARCHAR2(200) | Yes | |
| DESCRIPTION | VARCHAR2(200) | Yes | |
| PARENT_ACCOUNT | | | |
| NAME | VARCHAR2(255) | No | 1 |
| FACTOR | NUMBER(10, 0) | No | 2 |
| DISPLAYORDER | NUMBER(10, 0) | No | |
| MULTIPLIERTYPE | NUMBER(10, 0) | Yes | |
| ACCOUNT | | | |
| PARENT_NAME | VARCHAR2(255) | No | 1 |
| FACTOR | NUMBER(10, 0) | No | 2 |
| NAME | VARCHAR2(255) | No | 3 |
| ACCOUNTID | VARCHAR2(255) | Yes | |
| ACCOUNT_FACT | | | |
| PARENT_NAME | VARCHAR2(255) | No | 1 |
| FACTOR | NUMBER(10, 0) | No | 2 |
| ACCOUNT_NAME | VARCHAR2(255) | No | 3 |
| TRANSACTIONTIMEEND | TIMESTAMP(6) | No | 4 |
| YEAR | NUMBER(10, 0) | No | 5 |
| TRANSACTIONTIMESTART | TIMESTAMP(6) | Yes | |
| ISACTIVE | NUMBER(1, 0) | Yes | |
| DISPLAYORDER | NUMBER(10, 0) | Yes | |
| ACCOUNTTYPE | NUMBER(10, 0) | Yes | |
| CALCBEHAVIORTYPE | NUMBER(10, 0) | Yes | |
| EVENTID | NUMBER(10, 0) | Yes | |

Figure 20:
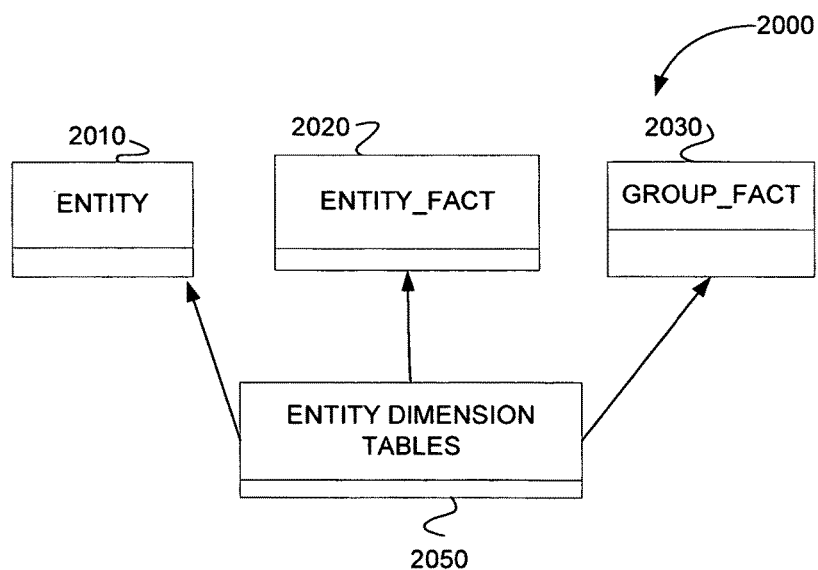
FIG. 20 is database schema illustrating, according to an example embodiment, various tables associated with an entity dimension of an OLAP cube.

FIG. 20 is a database schema 2000 illustrating, according to an example embodiment, various tables associated with an entity dimension of an OLAP cube. The schema 2000 may include the entity table 2010, the entity-fact table 2020, and the group-fact table 2030 forming the entity dimension tables 2050. The detailed structure of these tables is seen in Table 4 below.

TABLE 4

Entity Dimension Tables

| Column | Datatype | Nullable | Primary Key |
|---|---|---|---|
| ENTITY | | | |
| ENTITYID | VARCHAR2(255) | No | 1 |
| SUBCLASS | NUMBER(10, 0) | No | |
| NAME | VARCHAR2(255) | Yes | |
| ALLOWEDALLACCOUNT | NUMBER(1, 0) | Yes | |
| ENTITY_FACT | | | |
| ENTITYID | VARCHAR2(255) | No | 1 |
| TRANSACTIONTIMEEND | TIMESTAMP(6) | No | 2 |
| YEAR | NUMBER(10, 0) | No | 3 |
| TRANSACTIONTIMESTART | TIMESTAMP(6) | Yes | |
| ISACTIVE | NUMBER(1, 0) | Yes | |
| COMMENTS | VARCHAR2(255) | Yes | |
| ENTITYTYPE | NUMBER(10, 0) | Yes | |
| ISDOMESTIC | NUMBER(1, 0) | Yes | |
| ISFINANCIALENTITY | NUMBER(1, 0) | Yes | |
| FEIN | VARCHAR2(255) | Yes | |
| STATETREATMENT | NUMBER(10, 0) | Yes | |
| INDUSTRY | VARCHAR2(255) | Yes | |
| BUSINESSACTIVITY | VARCHAR2(255) | Yes | |
| EVENTID | NUMBER(10, 0) | Yes | |
| PARENTID | VARCHAR2(255) | Yes | |

TABLE 4-continued

Entity Dimension Tables

| Column | Datatype | Nullable | Primary Key |
|---|---|---|---|
| GROUP_FACT | | | |
| ENTITYID | VARCHAR2(255) | No | 1 |
| TRANSACTIONTIMEEND | TIMESTAMP(6) | No | 2 |
| YEAR | NUMBER(10, 0) | No | 3 |
| TRANSACTIONTIMESTART | TIMESTAMP(6) | Yes | |
| ISACTIVE | NUMBER(1, 0) | Yes | |
| COMMENTS | VARCHAR2(255) | Yes | |
| KEYCORP_ID | VARCHAR2(255) | Yes | |
| EVENTID | NUMBER(10, 0) | Yes | |

Figure 21:
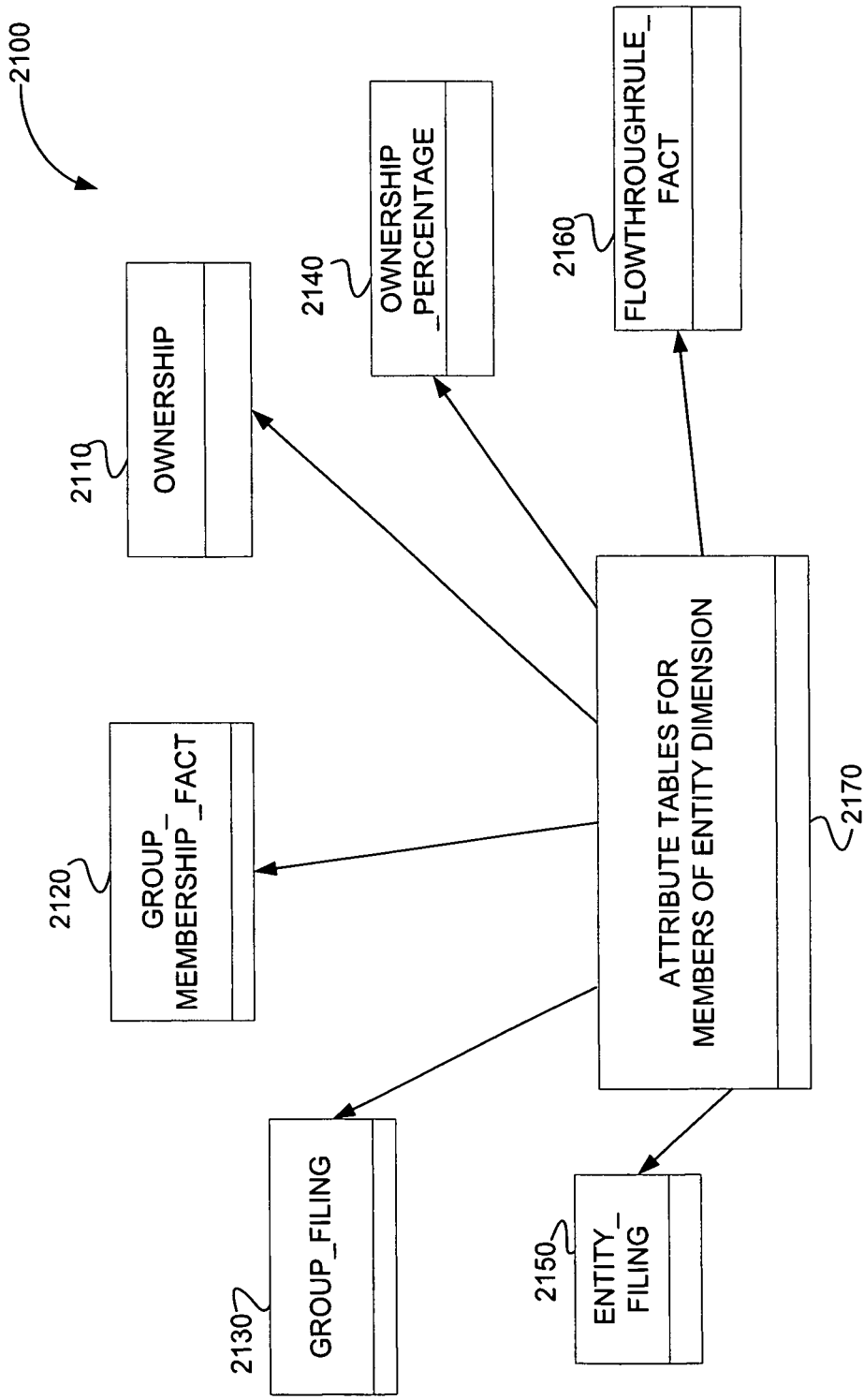
FIG. 21 is database schema illustrating, according to an example embodiment, various tables associated with attributes of an entity dimension of an OLAP cube.

FIG. 21 is a database schema 2100 illustrating, according to an example embodiment, various tables associated with members of the entity dimension of FIG. 5, including entity-filing table 2150, group-filing table 2130, group-membership-fact table 2120, ownership table 2110, ownership percentage table 2140, and flow-through-rule-fact table 2160 aggregated under members of an entity dimension attribute tables 2170. The attributes of these tables are shown in Table 5.

TABLE 5

Attribute Tables for Members of Entity Dimension

| Column | Datatype | Nullable | Primary Key |
|---|---|---|---|
| ENTITY_FILING | | | |
| JURISDICTION_ID | VARCHAR2(255) | No | 1 |
| TAXTYPE | NUMBER(10, 0) | No | 2 |
| ENTITY_ID | VARCHAR2(255) | No | 3 |
| TRANSACTIONTIMEEND | TIMESTAMP(6) | No | 4 |
| YEAR | NUMBER(10, 0) | No | 5 |
| TRANSACTIONTIMESTART | TIMESTAMP(6) | Yes | |
| FILINGDUEDATE | DATE | Yes | |
| ISPROTECTED | NUMBER(1, 0) | Yes | |
| ISOBLIGATED | NUMBER(1, 0) | Yes | |
| EVENTID | NUMBER(10, 0) | Yes | |
| GROUP_FILING | | | |
| JURISDICTION_ID | VARCHAR2(255) | No | 1 |
| TAXTYPE | NUMBER(10, 0) | No | 2 |
| ENTITY_ID | VARCHAR2(255) | No | 3 |
| TRANSACTIONTIMEEND | TIMESTAMP(6) | No | 4 |
| YEAR | NUMBER(10, 0) | No | 5 |
| TRANSACTIONTIMESTART | TIMESTAMP(6) | Yes | |
| FILINGDUEDATE | DATE | Yes | |
| FILINGTYPE | NUMBER(10, 0) | No | |
| ISWORLDWIDE | NUMBER(1, 0) | Yes | |
| ISEIGHTYTWENTY | NUMBER(1, 0) | Yes | |
| EVENTID | NUMBER(10, 0) | Yes | |
| GROUP_MEMBERSHIP_FACT | | | |
| ENTITY_ID | VARCHAR2(255) | No | 1 |
| GROUP_ID | VARCHAR2(255) | No | 2 |
| TRANSACTIONTIMEEND | TIMESTAMP(6) | No | 3 |
| YEAR | NUMBER(10, 0) | No | 4 |
| TRANSACTIONTIMESTART | TIMESTAMP(6) | Yes | |
| ISACTIVE | NUMBER(1, 0) | Yes | |
| EVENTID | NUMBER(10, 0) | Yes | |
| OWNERSHIP | | | |
| ENTITY_ID | VARCHAR2(255) | No | 1 |
| OWNER_ID | VARCHAR2(255) | No | 2 |
| TRANSACTIONTIMEEND | TIMESTAMP(6) | No | 3 |
| YEAR | NUMBER(10, 0) | No | 4 |
| TRANSACTIONTIMESTART | TIMESTAMP(6) | Yes | |
| ISUNITARY | NUMBER(1, 0) | Yes | |
| ISLIMITED | NUMBER(1, 0) | Yes | |
| EVENTID | NUMBER(10, 0) | Yes | |
| OWNERSHIP_PERCENTAGE | | | |
| CATEGORY | VARCHAR2(255) | No | 1 |
| ENTITY_ID | VARCHAR2(255) | No | 2 |
| OWNER_ID | VARCHAR2(255) | No | 3 |
| TRANSACTIONTIMEEND | TIMESTAMP(6) | No | 4 |
| YEAR | NUMBER(10, 0) | No | 5 |
| TRANSACTIONTIMESTART | TIMESTAMP(6) | Yes | 6 |

TABLE 5-continued

Attribute Tables for Members of Entity Dimension

| Column | Datatype | Nullable | Primary Key |
|---|---|---|---|
| BEGINNINGPERCENTAGE | FLOAT | Yes | 7 |
| ENDINGPERCENTAGE | FLOAT | Yes | |
| EVENTID | NUMBER(10, 0) | Yes | |
| FLOWTHRUGHRULE_FACT | | | |
| JURISDICTION_ID | VARCHAR2(255) | No | 1 |
| ENTITYTYPE | NUMBER(10, 0) | No | 2 |
| TRANSACTIONTIMEEND | TIMESTAMP(6) | No | 3 |
| YEAR | NUMBER(10, 0) | No | 4 |
| TRANSACTIONTIMESTART | TIMESTAMP(6) | Yes | |
| STATETREATMENTTYPE | NUMBER(10, 0) | Yes | |
| UNITARYGENERALMETHOD | NUMBER(10, 0) | Yes | |
| UNITARYLIMITEDMETHOD | NUMBER(10, 0) | Yes | |
| NONUNITARYGENERALMETHOD | NUMBER(10, 0) | Yes | |
| NONUNITARYLIMITEDMETHOD | NUMBER(10, 0) | Yes | |
| EVENTID | NUMBER(10, 0) | Yes | |

The tax accounts OLAP may include another dimension, tax rule dimension, built by the dimension builder module 1140. The attribute tables for members of tax rule dimension are shown in Table 6. The attribute tables are linked with the event-history table via the event ID attribute shown in these tables. There are other cross-linking attributes shown in Table 6 such as JURISDICTION_ID attribute or ENTITY_ID attribute that connect Table 3 with 2 and 4, respectively.

TABLE 6

Attribute Tables for Members of Tax Rule Dimension

| Column | Datatype | Nullable | Primary Key |
|---|---|---|---|
| TAXRULE_FACT | | | |
| TAXRULENAME | VARCHAR2(255) | No | 1 |
| JURISDICTION_ID | VARCHAR2(255) | No | 2 |
| TAXTYPE | NUMBER(10, 0) | No | 3 |
| TRANSACTIONTIMEEND | TIMESTAMP(6) | No | 4 |
| YEAR | NUMBER(10, 0) | No | 5 |
| TRANSACTIONTIMESTART | TIMESTAMP(6) | Yes | |
| PROPERTYFACTORATNETCOST | NUMBER(1, 0) | No | |
| IGNOREZERODENOM | NUMBER(1, 0) | No | |
| AVERAGERENT | NUMBER(1, 0) | No | |
| AVERAGEUSERDEFINED | NUMBER(1, 0) | No | |
| TAXMETHODTYPE | NUMBER(10, 0) | Yes | |
| RENTREALPROPERTYCAPFACTOR | NUMBER(10, 0) | No | |
| RENTPERSONALPROPERTYCAPFACTOR | NUMBER(10, 0) | No | |
| DECIMALPRECISION | NUMBER(10, 0) | No | |
| PROPERTYWEIGHT | NUMBER(10, 0) | No | |
| PAYROLL WEIGHT | NUMBER(10, 0) | No | |
| SALESWEIGHT | NUMBER(10, 0) | No | |
| USERDEFINEDWEIGHT | NUMBER(10, 0) | No | |
| EVENTID | NUMBER(10, 0) | Yes | |
| TAXRULEASSIGNMENT_FACT | | | |
| ENTITY_ID | VARCHAR2(255) | No | 1 |
| TAXRULENAME | VARCHAR2(255) | No | 2 |
| JURISDICTION_ID | VARCHAR2(255) | No | 3 |
| TAXTYPE | NUMBER(10, 0) | No | 4 |
| TRANSACTIONTIMEEND | TIMESTAMP(6) | No | 5 |
| YEAR | NUMBER(10, 0) | No | 6 |
| TRANSACTIONTIMESTART | TIMESTAMP(6) | Yes | |
| EVENTID | NUMBER(10, 0) | Yes | |
| TAXRULEINCEXC_FACT | | | |
| PARENT_NAME | VARCHAR2(255) | No | 1 |
| FACTOR | NUMBER(10, 0) | No | 2 |
| ACCOUNT_NAME | VARCHAR2(255) | No | 3 |
| TAXRULENAME | VARCHAR2(255) | No | 4 |
| JURISDICTION_ID | VARCHAR2(255) | No | 5 |
| TAXTYPE | NUMBER(10, 0) | No | 6 |
| TRANSACTIONTIMEEND | TIMESTAMP(6) | No | 7 |
| YEAR | NUMBER(10, 0) | No | 8 |
| TRANSACTIONTIMESTART | TIMESTAMP(6) | Yes | |

TABLE 6-continued

Attribute Tables for Members of Tax Rule Dimension

| Column | Datatype | Nullable | Primary Key |
|---|---|---|---|
| INCLUDED | NUMBER(1, 0) | No | |
| EVENTID | NUMBER(10, 0) | Yes | |
| TAXRULERATE_FACT | | | |
| TAXBRACKET | NUMBER(10, 0) | No | 1 |
| FINANCIALRATE | NUMBER(1, 0) | No | 2 |
| TAXRULENAME | VARCHAR2(255) | No | 3 |
| JURISDICTION_ID | VARCHAR2(255) | No | 4 |
| TAXTYPE | NUMBER(10, 0) | No | 5 |
| TRANSACTIONTIMEEND | TIMESTAMP(6) | No | 6 |
| YEAR | NUMBER(10, 0) | No | 7 |
| TRANSACTIONTIMESTART | TIMESTAMP(6) | Yes | |
| TAXRATE | FLOAT | No | |
| EVENTID | NUMBER(10, 0) | Yes | |

Figure 22:
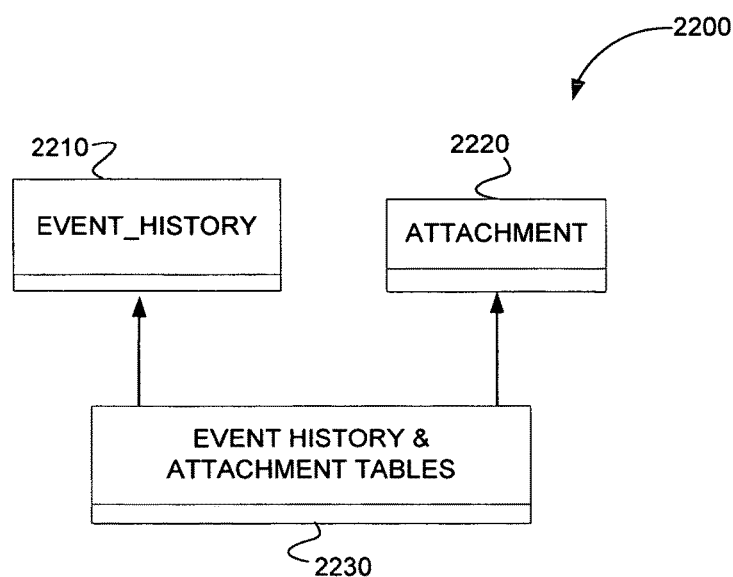
FIG. 22 is database schema illustrating, according to an example embodiment, event history and attachment tables of an OLAP cube.

FIG. 22 is a database schema 2200 illustrating, according to an example embodiment, event history and attachment tables of an OLAP cube. The schema 2200 includes the event-history table 2210 and the attachment table 2220. These tables may be aggregated by the aggregation module 1160 to form the event-history & attachment tables 2230. The attributes of these tables are shown in Table 7. The event-history table 2210 and the attachment table 2220 are linked via the event ID attribute, which is shown in both tables.

TABLE 7

Event History & Attachment Tables

| Column | Datatype | Nullable | Primary Key |
|---|---|---|---|
| EVENT_HISTORY | | | |
| ID | NUMBER(10, 0) | No | 1 |
| KEYSTRING | VARCHAR2(255) | Yes | |
| EVENTTIMESTAMP | TIMESTAMP(6) | Yes | |
| USERID | VARCHAR2(255) | Yes | |
| EVENTOPERATIONTYPE | NUMBER(10, 0) | Yes | |
| EVENTOBJECTTYPE | NUMBER(10, 0) | Yes | |
| USERCOMMENT | VARCHAR2(512) | Yes | |
| YEAR | NUMBER(10, 0) | Yes | |
| ATTACHMENT | | | |
| ID | NUMBER(10, 0) | | 1 |
| FILENAME | VARCHAR2(255) | Yes | |
| TIMESTAMP | TIMESTAMP(6) | Yes | |
| USERID | VARCHAR2(255) | Yes | |
| FILECONTENT | BLOB | Yes | |
| EVENTID | NUMBER(10, 0) | Yes | |

Figure 23:
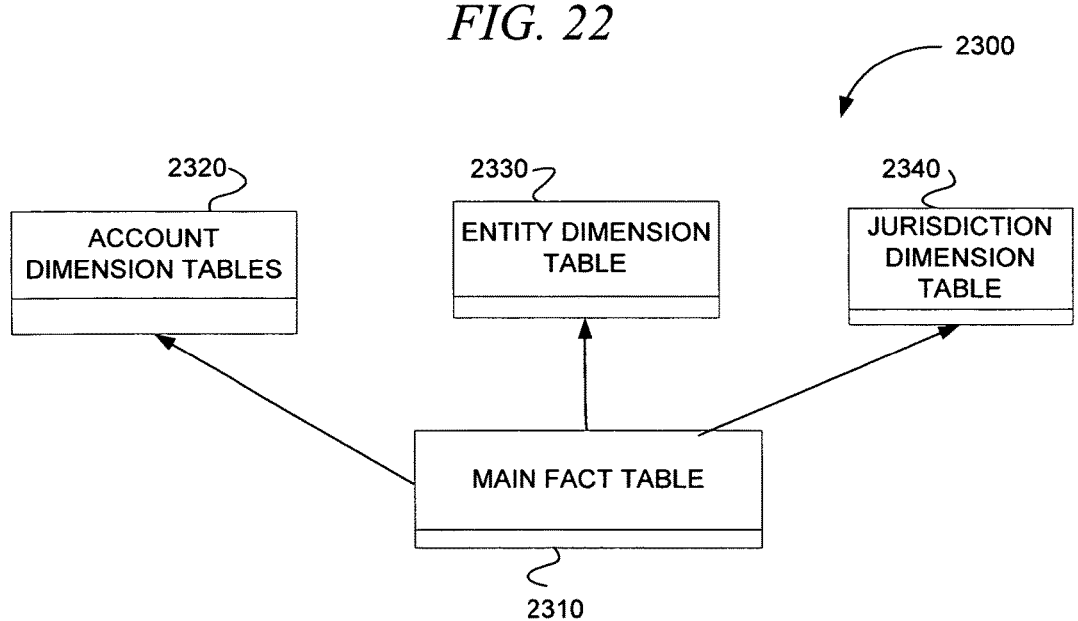
FIG. 23 is database schema illustrating, according to an example embodiment, various tables associated with a main fact table of an OLAP cube.

FIG. 23 is a database schema 2300 illustrating, according to an example embodiment, various tables associated with a main fact table of an OLAP cube. According to an example embodiment, the main fact table 2310 is related to the account dimension tables 2320, entity dimension table 2330, and the jurisdiction dimension table 2340. In example embodiments, the attribute ACCOUNT NAME may be the linking attribute between the main fact table 2310 and the account dimension tables 2320. The cross-linking between the main fact table 2310 and the entity dimension table 2320 may be provided by the ENTITY_ID attribute. The main fact table 2310 may be linked to the jurisdiction dimension table 2340 via the JURISDICTION_ID attribute.

Figure 24:
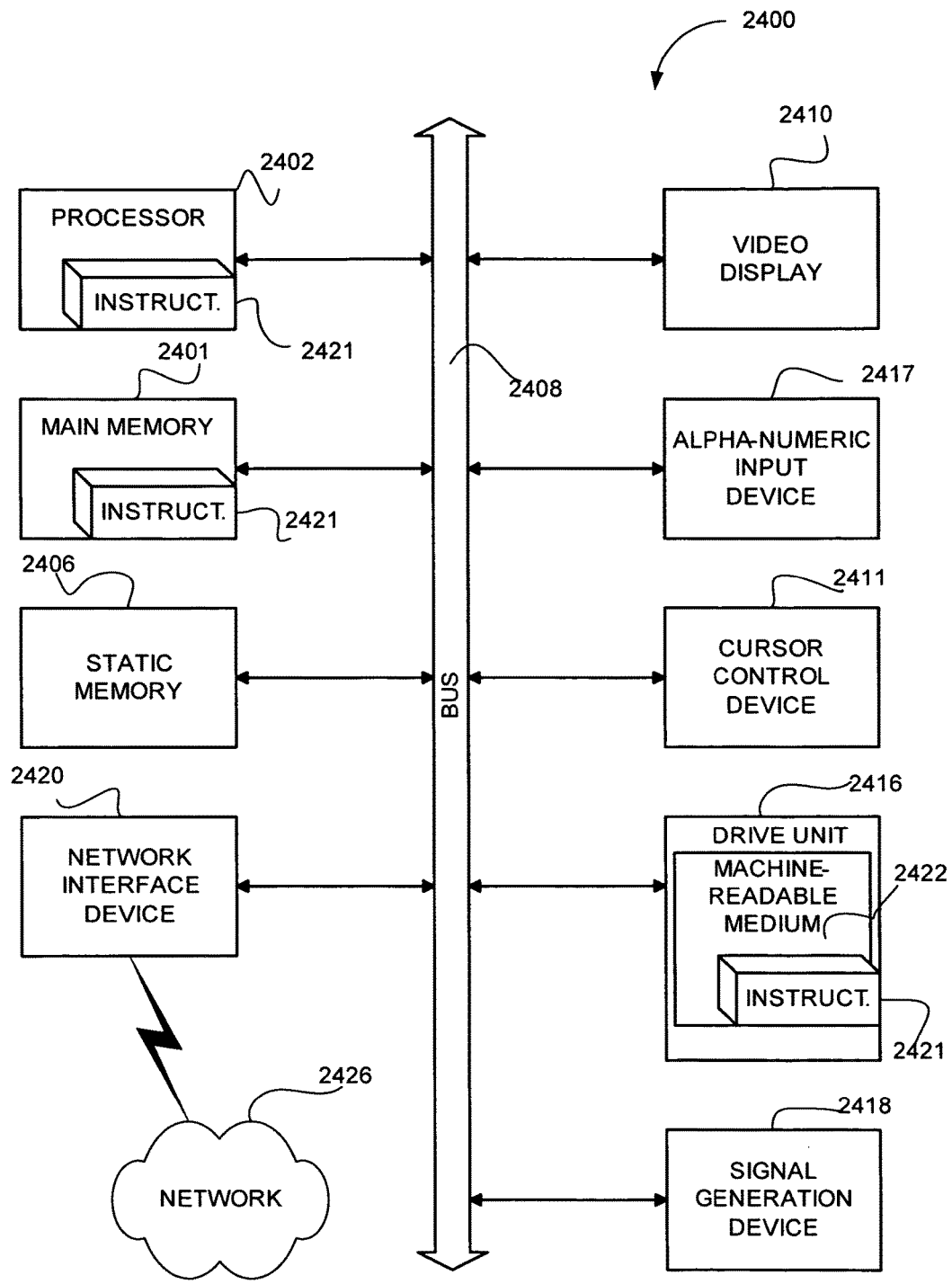
FIG. 24 is a block diagram illustrating a diagrammatic representation of a machine in the example form of a computer system.

FIG. 24 illustrates a diagrammatic representation of a machine in the example form of a computer system 2400 within which a set of instructions may be executed to cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a Personal Computer (PC), a tablet PC, a Set-Top Box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2400 includes a processor 2402 (e.g., a Central Processing Unit (CPU), a Graphics Processing Unit (GPU), or both), a main memory 2401 and a static memory 2406, which communicate with each other via a bus 2408. The computer system 2400 may further include a video display unit 2410 (e.g., a Liquid Crystal Display (LCD) or a Cathode Ray Tube (CRT)). The computer system 2400 also includes an alphanumeric input device 2417 (e.g., a keyboard), a cursor control device 2411 (e.g., a mouse), a drive unit 2416 (e.g., hard-disk drive), a signal generation device 2418 (e.g., a speaker) and a network interface device 2420.

The drive unit 2416 includes a machine-readable medium 2422 on which is stored one or more sets of instructions (e.g., software) 2421 embodying any one or more of the methodologies or functions described herein. The instructions 2421 may also reside, completely or at least partially, within the main memory 2401 and/or within the processor 2402 during execution thereof by the computer system 2400, the main memory 2401 and the processor 2402 also constituting machine-readable media. The instructions 2421 may further be transmitted or received over a network 2426 via the network interface device 2420.

While the machine-readable medium 2422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

A System of Transmission Between a Server and Client

Some embodiments may utilize the OSI basic reference model or TCP/IP protocol stack model for defining the protocols used by a network to transmit data. Operation 1410 and 1440 may use these protocols. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack.

In an example implementation using the TCP/IP protocol stack model, data from an application residing at the application layer is loaded into the data load field of a TCP segment residing at the transport layer. This TCP segment also includes port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, LAN, WAN, or some other suitable network. In some cases, internet refers to a network of networks. These networks may use a variety of protocols for the exchange of data, including the aforementioned TCP/IP, or some other suitable protocol. These networks may be organized within a variety of topologies (e.g., a star topology), or structures.

Thus, a method and a system for data validity documentation have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method for performing tax calculations and for using time-stamped data to track modifications made over time to data to document versions of tax calculations and tax positions asserted by a tax reporting entity, the method comprising:

receiving data comprising a first data version associated with a first time stamp and a second data version associated with a second time stamp, the second data version representing a modified version of the first data version, the first and second time stamps having been automatically associated respectively with the first and second data versions by a computer without intervention from a user and representing an actual time each data version was saved to memory, the data for use in performing tax calculations;

building a first Online Analytical Processing (OLAP) cube version related to a first tax position asserted by the tax reporting entity related to a tax issue, the first OLAP cube version including a dimension, the dimension acting as a schema for the first data version that includes the first time stamp;

populating the first OLAP cube version with a first object, the first object including the first data version and the first time stamp as at least one attribute;

using the first OLAP cube version to perform tax calculations and to generate a first tax related data set related to the first tax position;

attaching a first document to the first tax related data set by generating a first attachment record comprising a first attachment time stamp attribute;

building a second OLAP cube version related to a second tax position asserted by the tax reporting entity related to the tax issue, the second OLAP cube version including a dimension, the dimension acting as a schema for the second data version that includes the second time stamp;

populating the second OLAP cube version with a second object, the second object including the second data version and the second time stamp as at least one attribute;

using the second OLAP cube version to perform tax calculations and to generate a second tax related data set related to the second tax position and different from the first tax related data set; and attaching a second document to the second tax related data set by generating a second attachment record comprising a second attachment time stamp attribute;

whereby using a time-based criteria the first and second OLAP cube versions may be restored at a later date and after modifications to the data have occurred to generate time-based versions of the tax calculations performed and tax positions asserted by the tax reporting entity.

2. The computer-implemented method of claim 1, further comprising: modifying the data to create modified data, the modifying categorized as an event; and associating an additional time stamp with the modified data to reflect a time of the event.

3. The computer-implemented method of claim 2, further comprising storing the event into an event history, the event history including a time of the event.

4. The computer-implemented method of claim 2, further comprising building a plurality of OLAP cube versions respectively using a plurality of data versions to respectively generate a plurality of tax related data sets.

5. The computer-implemented method of claim 4, further comprising using a time-based criteria to selectively build one of the plurality of OLAP cube versions based on time-stamp data associated with the plurality of data versions.

6. The computer-implemented method of claim 1, wherein the first and second OLAP cube versions are stored into Random Access Memory (RAM).

7. The computer-implemented method of claim 1, wherein the dimension includes at least one of an entity dimension, an account dimension, or a jurisdiction dimension.

8. A computer-implemented method for performing tax calculations and for using data associated with a time attribute to track modifications made over time to data to document versions of tax calculations and tax positions asserted by a tax reporting entity, the method comprising:
   retrieving a first Online Analytical Processing (OLAP) cube related to a first tax position asserted by the tax reporting entity related to a tax issue and populated with first object, the first object including a first time attribute and a first data attribute, the first time attribute automatically associated with the first data attribute without intervention from a user, the first time attribute representing an actual time the first data attribute was modified;
   performing a first tax related calculation using the first OLAP cube and data retrieved from the data attribute, the calculation reflecting the data at a first time defined by the first time attribute;
   attaching a first document to the data defined by the first time attribute by generating a first attachment record comprising the first time attribute;
   displaying a result of the first calculation associated with the first time, the result including a first tax related data set related to the first tax position;
   retrieving a second OLAP cube related to a second tax position asserted by the tax reporting entity related to the tax issue and populated with second object, the second object including a second time attribute and a second data attribute, the second time attribute automatically associated with the second data attribute without intervention from a user, the second time attribute representing an actual time the second data attribute was modified;
   performing a second tax related calculation using the second OLAP cube and data retrieved from the second data attribute, the calculation reflecting the data at a second time defined by the second time attribute;
   attaching a second document to the data defined by the second time attribute by generating a second attachment record comprising the second time attribute;
   displaying a result of the second calculation associated with the second time, the result including a second tax related data set related to the second tax position;
   whereby using a time-based criteria the first and second OLAP cubes may be restored at a later date and after modifications to the data have occurred to generate time-based versions of the tax calculations performed and tax positions asserted by the tax reporting entity.

9. The computer-implemented method of claim 8, wherein the first time and the second time are part of an event history for the data, the event history including a history of modifications made to the data.

10. The computer-implemented method of claim 8, wherein the first and second OLAP cubes include a dimension that includes at least one of an entity dimension, an account dimension, or a jurisdiction dimension.

11. The computer-implemented method of claim 8, further comprising querying the first or second OLAP cubes using a Multidimensional Expression (MDX) language.

12. A computer system for processing tax related data in performing tax calculations and for using time-stamped data to track modifications made over time to data to document versions of tax calculations, the system comprising:
   a receiver to receive tax related data comprising a first tax related data version associated with a first time stamp and a second tax related data version associated with a second time stamp, the second tax related data version representing a modified version of the first tax related data version, the first and second time stamps having been automatically associated respectively with the first and second data versions by a computer without intervention from a user and representing an actual time each data version was saved to memory;
   a cube building engine to build a first Online Analytical Processing (OLAP) cube version related to a first tax position asserted by the tax reporting entity related to a tax issue, the first OLAP cube version including a dimension, the dimension acting as a schema for the first tax related data version that includes the first time stamp, and to build a second OLAP cube version related to a second tax position asserted by the tax reporting entity related to the tax issue, the second OLAP cube version including a dimension, the dimension acting as a schema for the second tax related data version that includes the second time stamp;
   an object population engine to populate the first OLAP cube version with a first object, the first object including the first tax related data and the first time stamp as at least one attribute, and to populate the second OLAP cube version with a second object, the second object including the second data version and the second time stamp as at least one attribute; and
   a processor adapted to use the first and second OLAP cube versions to perform tax calculations and to generate first and second tax related result data sets representing time-based version of the tax calculations performed, and related to the first and second tax positions respectively; and
   attaching a first document to the first tax related result data set by generating a first attachment record comprising a first attachment time stamp attribute, and attaching a second document to the second tax related result data set by generating a second attachment record comprising a second attachment time stamp attribute;
   whereby using a time-based criteria the first and second OLAP cube versions may be restored at a later date and after modifications to the data have occurred to generate additional time-based versions of the tax calculations performed and tax positions asserted by the tax reporting entity.

13. The computer system of claim 12, further comprising:
   a data modification engine to modify the tax related data to create modified tax related data, the modification categorized as an event; and
   an association engine to associate an additional time stamp with the modified tax related data to reflect a time of the event.

14. The computer system of claim 13, further comprising an event aggregation engine to store the event into an event history, the event history including the time of the event.

15. The computer system of claim 12, wherein the first and second OLAP cube versions are stored into Random Access Memory (RAM).

16. The computer system of claim 12, wherein the dimension includes at least one of an entity dimension, an account dimension, or a jurisdiction dimension.

17. A computer system for processing tax related data in performing tax calculations, the system comprising:
a cube retrieval engine to retrieve a first Online Analytical Processing (OLAP) cube related to a first tax position asserted by the tax reporting entity related to a tax issue and populated with a first object, the first object including a first time attribute and a first data attribute, the first time attribute automatically associated with the first data attribute without intervention from a user, the first time attribute representing an actual time the first data attribute was modified, and to retrieve a second OLAP cube related to a second tax position asserted by the tax reporting entity related to the tax issue and populated with second object, the second object including a second time attribute and a second data attribute, the second time attribute automatically associated with the second data attribute without intervention from a user, the second time attribute representing an actual time the second data attribute was modified;
a tax calculation engine to perform a first tax related calculation using first tax related data retrieved from the first data attribute, the first tax related calculation reflecting the first tax related data at a first time defined by the first time attribute, and to perform to perform a second tax related calculation using second tax related data retrieved from the second data attribute, the second tax related calculation reflecting the second tax related data at a second time defined by the second time attribute;
a display to display a first tax related result of the first calculation associated with the first time, the first tax related result related to the first tax position, and to display a second tax related result of the second calculation associated with the second time, the second tax related result related to the second tax position; and
the tax calculation engine further adapted to attach a first document to the first tax related data by generating a first attachment record comprising a first attachment time stamp attribute, and attaching a second document to the second tax related data by generating a second attachment record comprising a second attachment time stamp attribute;
whereby using a time-based criteria the first and second OLAP cubes may be restored at a later date and after modifications to the data have occurred to generate additional time-based versions of the tax calculations performed and tax positions asserted by the tax reporting entity.

18. The computer system of claim 17, wherein the first time and the second time are part of an event history for the tax related data, the event history including a history of modifications made to the tax related data.

19. The computer system of claim 17, wherein the first and second OLAP cubes include a dimension that includes at least one of an entity dimension, an account dimension, or a jurisdiction dimension.

20. The computer system of claim 17, further comprising a query engine to query the first and second OLAP cubes through the use of a Multidimensional Expression (MDX) language.

21. An apparatus comprising:
means for retrieving a first Online Analytical Processing (OLAP) cube related to a first tax position asserted by a tax reporting entity related to a tax issue and populated with a first object, the first object including a first time attribute and a first data attribute, the first time attribute automatically associated with the first data attribute without intervention from a user, the first time attribute representing an actual time the first data attribute was modified;
means for processing the first OLAP cube and performing a first tax calculation using first tax related data retrieved from the first data attribute, the first tax calculation reflecting the first tax related data at a first time defined by the first time attribute;
means for displaying a first tax related result of the first tax calculation associated with the first time, the first tax related result related to the first tax position;
means for retrieving a second OLAP cube related to a second tax position asserted by the tax reporting entity related to the tax issue and populated with a second object, the second object including a second time attribute and a second data attribute, the second time attribute automatically associated with the second data attribute without intervention from a user, the second time attribute representing an actual time the second data attribute was modified;
means for processing the second OLAP cube and performing a second tax calculation using second tax related data retrieved from the second data attribute, the second tax calculation reflecting the second tax related data at a second time defined by the second time attribute;
means for displaying a second tax related result of the second tax calculation associated with the second time, the second tax related result related to the second tax position;
whereby using a time-based criteria the first and second OLAP cubes may be restored at a later date and after modifications to the data have occurred to generate time-based versions of the tax calculations performed and tax positions asserted by the tax reporting entity; and
means for attaching a first document to the first tax related data by generating a first attachment record comprising a first attachment time stamp attribute, and attaching a second document to the second tax related data by generating a second attachment record comprising a second attachment time stamp attribute.

22. A non-transitory machine-readable medium comprising instructions, which when implemented by one or more machines, cause the one or more machines to perform the following operations:
retrieve a first Online Analytical Processing (OLAP) cube related to a first tax position asserted by a tax reporting entity related to a tax issue and populated with a first object, the first object including a first time attribute and a first data attribute, the first time attribute automatically associated with the first data attribute without intervention from a user, the first time attribute representing an actual time the first data attribute was modified;
perform a first tax calculation using tax related data retrieved from the first data attribute, the first tax calculation reflecting the tax related data at a first time defined by the first time attribute;
display a tax related result of the first tax calculation associated with the first time, the result including a first tax related data set related to the first tax position;
retrieve a second OLAP cube related to a second tax position asserted by the tax reporting entity related to the tax issue and populated with a second object, the second object including a second time attribute and a second data attribute, the second time attribute automatically associated with the second data attribute without intervention from a user, the second time attribute representing an actual time the second data attribute was modified;

perform a second tax calculation using tax related data retrieved from the second data attribute, the second tax calculation reflecting the tax related data at a second time defined by the second time attribute;

display a tax related result of the second tax calculation associated with the second time, the result including a second tax related data set related to the second tax position; and attach a first document to the first tax related data set by generating a first attachment record comprising a first attachment time stamp attribute, and attach a second document to the second tax related data set by generating a second attachment record comprising a second attachment time stamp attribute;

whereby using a time-based criteria the first and second OLAP cubes may be restored at a later date and after modifications to the data have occurred to generate time-based versions of the tax calculations performed and tax positions asserted by the tax reporting entity.

\* \* \* \* \*